United States Patent
Hirano et al.

(10) Patent No.: US 8,495,268 B2
(45) Date of Patent: Jul. 23, 2013

(54) CARD HOST LSI AND SET DEVICE INCLUDING THE SAME

(75) Inventors: Takehisa Hirano, Osaka (JP); Makoto Fujiwara, Kyoto (JP); Koichiro Fue, Osaka (JP); Rie Itou, Osaka (JP); Kentaro Shiomi, Kyoto (JP)

(73) Assignee: Panasonic Corporation, Osaka (JP)

( * ) Notice: Subject to any disclaimer, the term of this patent is extended or adjusted under 35 U.S.C. 154(b) by 52 days.

(21) Appl. No.: 12/861,569

(22) Filed: Aug. 23, 2010

(65) Prior Publication Data

US 2010/0318690 A1 Dec. 16, 2010

Related U.S. Application Data

(63) Continuation of application No. PCT/JP2009/000410, filed on Feb. 3, 2009.

(30) Foreign Application Priority Data

Aug. 22, 2008 (JP) .................................. 2008-214569
Dec. 16, 2008 (JP) .................................. 2008-319594

(51) Int. Cl.
*G06F 13/00* (2006.01)
*G06F 3/00* (2006.01)

(52) U.S. Cl.
USPC ............... 710/300; 710/305; 710/36; 710/13; 710/14

(58) Field of Classification Search
USPC ................... 710/2–4, 8–14, 36–39, 300–302, 710/305–306; 711/100
See application file for complete search history.

(56) References Cited

U.S. PATENT DOCUMENTS

| 4,905,182 | A | * | 2/1990 | Fitch et al. ..................... 710/301 |
| 5,878,127 | A | * | 3/1999 | Fleischer, III ............ 379/221.08 |
| 5,892,964 | A | * | 4/1999 | Horan et al. ..................... 712/33 |
| 5,913,045 | A | * | 6/1999 | Gillespie et al. ............... 710/311 |
| 6,081,858 | A | * | 6/2000 | Abudayyeh et al. .......... 710/301 |
| 6,697,906 | B1 | * | 2/2004 | Ayukawa et al. ............. 710/316 |
| 6,874,044 | B1 | * | 3/2005 | Chou et al. ...................... 710/62 |
| 6,880,024 | B2 | * | 4/2005 | Chen et al. ...................... 710/62 |
| 6,917,998 | B1 | * | 7/2005 | Giles ............................ 710/300 |
| 7,117,311 | B1 | * | 10/2006 | Rankin et al. ................. 711/146 |

(Continued)

FOREIGN PATENT DOCUMENTS

| CN | 1758622 A | 4/2006 |
| JP | 06-266654 | 9/1994 |

(Continued)

OTHER PUBLICATIONS

Mei Co., Ltd., "MN66829 RF Outline Specification Version 1.01," Jul. 15, 2008.

(Continued)

*Primary Examiner* — Christopher Shin
(74) *Attorney, Agent, or Firm* — McDermott Will & Emery LLP

(57) ABSTRACT

In a set device having a card host LSI, high-speed data transmission to a removable card or the like is realized without hindering a reduction in size and weight. The card host LSI and the removable card are connected to a card bus complying with predetermined card bus specifications. A microcomputer module and the card host LSI are connected also by a card bus complying with the predetermined card bus specifications.

29 Claims, 16 Drawing Sheets

U.S. PATENT DOCUMENTS

| | | | |
|---|---|---|---|
| 7,386,638 B2 * | 6/2008 | Voth et al. | 710/10 |
| 7,552,245 B2 * | 6/2009 | Sherman et al. | 710/15 |
| 7,587,544 B2 * | 9/2009 | Tang et al. | 710/260 |
| 7,634,611 B2 * | 12/2009 | Hidai et al. | 710/314 |
| 7,814,337 B2 * | 10/2010 | Lee et al. | 713/193 |
| 7,822,934 B2 * | 10/2010 | Morozumi et al. | 711/163 |
| 2004/0205268 A1 | 10/2004 | Takinosawa et al. | |
| 2005/0258243 A1 | 11/2005 | Hsieh | |
| 2007/0271612 A1 * | 11/2007 | Fang et al. | 726/22 |
| 2010/0185808 A1 * | 7/2010 | Yu et al. | 711/103 |

FOREIGN PATENT DOCUMENTS

| | | |
|---|---|---|
| JP | 06-266654 A | 9/1994 |
| JP | 2000-196648 A | 7/2000 |
| JP | 2000-315186 | 11/2000 |
| JP | 3103833 U | 6/2004 |
| JP | 2005-182370 | 7/2005 |
| JP | 2007-304875 | 11/2007 |
| JP | 2008-139350 A | 6/2008 |
| JP | 2008-139360 | 6/2008 |
| JP | 2008-139360 A | 6/2008 |
| WO | WO 2005/066745 A1 | 7/2005 |

OTHER PUBLICATIONS

Partial translation of Chinese Office Action dated Mar. 27, 2013, issued in a corresponding Chinese application.

* cited by examiner

FIG.5

COMMAND MAP OF REGISTER THROUGH MODE

| COMMAND | CHARACTERISTICS | RESPONSE | DATA |
|---|---|---|---|
| MODE SWITCHING | MODE SWITCHING OF CARD HOST LSI SUCH AS SWITCHING OF BUS SWITCH | NONE | NONE |
| DATA BUFFER #C READING | CONTINUOUS ACCESS TO SPECIFIC ADDRESS | ACCESSED | ACCESSED |
| DATA BUFFER #C WRITING | CONTINUOUS ACCESS TO SPECIFIC ADDRESS | ACCESSED | ACCESSED |
| DATA BUFFER #B READING | CONTINUOUS ACCESS TO SPECIFIC ADDRESS | ACCESSED | ACCESSED |
| DATA BUFFER #B WRITING | CONTINUOUS ACCESS TO SPECIFIC ADDRESS | ACCESSED | ACCESSED |
| DATA BUFFER #A READING | CONTINUOUS ACCESS TO SPECIFIC ADDRESS | ACCESSED | ACCESSED |
| DATA BUFFER #A WRITING | CONTINUOUS ACCESS TO SPECIFIC ADDRESS | ACCESSED | ACCESSED |
| REGISTER READING | READING ACCESS TO PREREAD RESULTS | ACCESSED | ACCESSED |
| REGISTER SETTING | RANDOM ACCESS (Write/PreRead) | ACCESSED | ACCESSED |

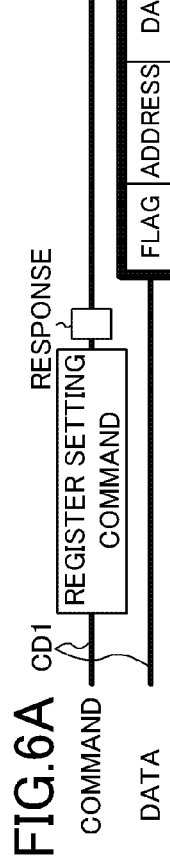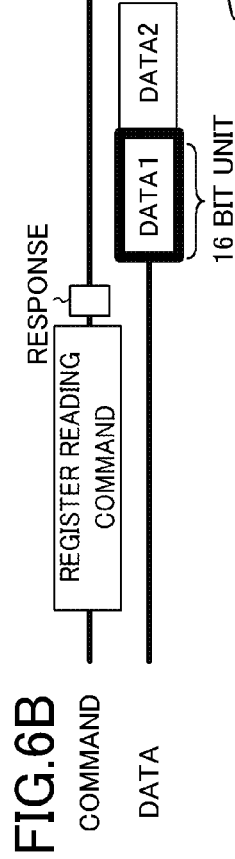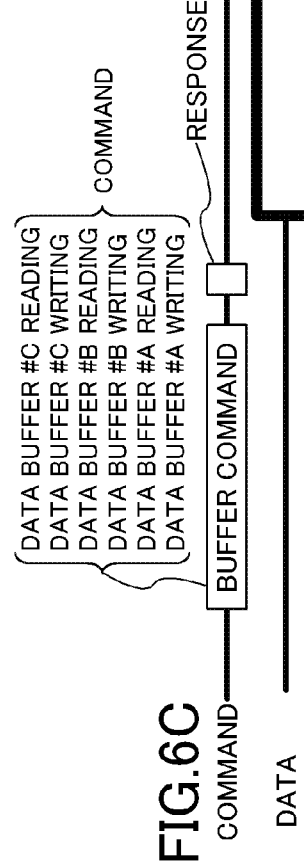

FIG.7A

Register Setting Command

| Data | | | | | |
|---|---|---|---|---|---|
| Bit Position | 31 | [30:29] | [28:24] | [23:16] | [15:8] | [7:0] |
| Name | LastFrame | RW | Stuff | Address | UpperData | LowerData |
| Width | 1 | 2 | 5 | 8 | 8 | 8 |
| Value | 0 Next Frame Present<br>Next Frame Non-present | 00 Word Write<br>01 Upper Byte Write<br>10 Lower Byte Write<br>11 Word Read | 0 | Word Address | At Write:Upper byte data<br>At Read:0 | Lower byte data<br>At Read:0 |

When Stuff bit is provided between flag and address, frame can be used for not only flag expansion but also upper bit expansion of address.

FIG.7B

Register Setting Command
Read-Extension(Read modify Write / Compatibility with COPY)

| Data | | | | | | | |
|---|---|---|---|---|---|---|---|
| Bit Position | 31 | [30:29] | 28 | 27 | 26 | 25 | [24:16] | [15:13] | [12:10] | [9:0] |
| Name | LastFrame | RW | Debug | EXT | TargetByte | POL | SourceAddress | BitPosition | BitWidth | DestinationAddress |
| Width | 1 | 2 | 1 | 1 | 1 | 1 | 9 | 3 | 3 | 10 |
| Value | 0 Next Frame Present<br>Next Frame Non-present | 11 Word Read | 0:log OFF<br>1:log ON | 0:Normal<br>1: ReadModifyWrite or Copy | 0:Set to LowerByte<br>1:Set to UpperByte | 0:Set to 0<br>1:Set to 1 | Source Address | Upper bit position<br>0:Bit8/Bit0<br>1:Bit9/Bit1<br>:<br>6:Bit14/Bit6<br>7:Bit15/Bit7 | Bit width<br>0:Copy<br>1:1 Bit width<br>:<br>6:6 Bit width<br>7:7 Bit width | Destination address |

Since bit width 0 has not meaning, allocate to Copy.

FIG.7C

Register Setting Command
Write-Extension(Simultaneous writing into a plurality of IPs)

| Data | | | | | | |
|---|---|---|---|---|---|---|
| Bit Position | 31 | [30:29] | 28 | 27 | [26:24] | [23:16] | [15:8] | [7:0] |
| Name | LastFrame | RW | Debug | EXT | TargetIf | Address | UpperData | LowerData |
| Width | 1 | 2 | 1 | 1 | 3 | 8 | 8 | 8 |
| Value | 0 Next Frame Present<br>Next Frame Non-present | 00 Word Write<br>01 Upper Byte Write<br>10 Lower Byte Write | 0:log OFF<br>1:log ON | 0:Normal<br>1:Multi Register Write | b[26]:IF-A<br>b[25]:IF-B<br>b[24]:IF-C | Word Address | At Write:Upper byte data<br>At Read:0 | Lower byte data<br>At Read:0 |

CARD HOST LSI AND SET DEVICE INCLUDING THE SAME

CROSS-REFERENCE TO RELATED APPLICATION

This is a continuation of PCT International Application PCT/JP2009/000410 filed on Feb. 3, 2009, which claims priority to Japanese Patent Application Nos. 2008-214569 filed on Aug. 22, 2008 and 2008-319594 filed on Dec. 16, 2008. The disclosures of these applications including the specifications, the drawings, and the claims are hereby incorporated by reference in their entirety.

BACKGROUND

The present disclosure relates to set devices having a function for controlling removable cards such as SD cards and embedded modules corresponding to the removable cards.

Multimedia start to be in widespread use in portable devices. Slots of small card media such as SD cards are mounted to cellular phone terminals, and these cellular phone terminals are used a lot as external storage media. Conventionally, in order to control small card media, a card host LSI has been connected to the outside of a microcomputer LSI in a portable telephone terminal, and the card host LSI has accessed to the small card media.

In general, low-speed general-purpose port terminals for mainly performing serial communication and terminal control, and high-speed IO bus terminals for mainly performing parallel communication are present as external communication terminals of the microcomputer LSI. The connection between the microcomputer LSI and the card host LSI is controlled by using not general-purpose ports but higher-speed IO buses in order to realize high-speed communication of data.

FIG. 14 is a diagram illustrating one example of a conventional constitution of a set device using the card host LSI. The set device 500 shown in FIG. 14 has a main microcomputer LSI 50, a card host LSI 501, and peripheral IO-LSIs 27a and 27b. A SD card 110 is attachable to the set device 500.

The peripheral IO-LSIs 27a and 27b, and the card host LSI 501 are connected to the main microcomputer LSI 50 via an IO bus IB2. An IO bus I/F 51 in the main microcomputer LSI 50 functions as a master of the IO bus IB2, and the peripheral IO-LSIs 27a and 27b, and the card host LSI 501 are slave devices of the IO bus IB2.

The card host LSI 501 has an SD card host I/F 531 that is controlled by register setting from the IO bus IB2, and functions as a master of a card bus CB2 for SD cards. The SD card host I/F 531 reads and writes data in an SD card 110 via the card bus CB2 according to the control from the IO bus IB2.

FIG. 15 is a diagram illustrating a detailed constitution of the IO bus IB2. The IO bus IB2 is composed of a 7-bit address line, a 16-bit bidirectional data line, a write enable line, a read enable line, and one-bit chip selects 1, 2 and 3.

An IO bus I/F 51 in the main microcomputer LSI 50 outputs an address signal, a write enable signal and a read enable signal to the card host LSI 501 and the peripheral IO-LSIs 27a and 27b as the slave devices. Further, the IO bus I/F 51 performs bidirectional data communication with slave device selected by the chip selects 1, 2 and 3. The card host LSI 501 and the peripheral IO-LSIs 27a and 27b output interrupt signals to the main microcomputer LSI 50.

FIG. 16 is a diagram illustrating a detailed constitution of the card bus CB2. The card bus CB2 is composed of a one-bit bidirectional command line, a four-bit bidirectional data line, and one-bit clock line. The SD card host I/F 531 in the card host LSI 501 outputs a clock to the SD card 110. The SD card host I/F 531 transmits and receives a command and data in synchronization with the clock.

With the above constitution, the set device 500 is compatible with small card media such as SD cards.

SUMMARY

As to portable devices such as cellular phone terminals, sets become diversified like dissemination devices, second-grade devices and high-class devices due to conflicting demands for an increase in function range, a decrease in size and weight and a decrease in price, and thus peripheral functions are selectively mounted according to the sets. In recent years, cellular phone terminals including dissemination devices through high-class devices are shipped with small card media as backup media for address books and e-mails.

The high-class devices treat large volumes of data such as moving images, and thus higher-speed data transmission than the conventional speed is required for the small card media.

However, in the conventional constitution, a bandwidth of an IO bus for connecting a microcomputer module to a card host LSI limits a speed of the access to the small card media, and thus this hinders the high-speed data transmission. In order to solve this problem and improve the transmission speed, normally a data bit width of an IO bus is expanded.

However, when the data bit width of the IO bus is simply expanded, a number of terminals in the microcomputer module and the card host LSI increases, and this increases a mounting area. Further, a space necessary for installing a wiring of an IO bus increase. For this reason, particularly in portable devices such as mobile telephones, the reduction in size and weight cannot be maintained.

When various peripheral LSIs (for example, USB-LSI and memory) are connected to an IO bus, a plurality of card host LSIs cannot be connected to a main microcomputer with no free space for the IO bus. For this reason, a plurality of cards cannot be used, load capacity of the IO bus increases, a delay of a bus line becomes large, and thus throughput of the bus is deteriorated.

The present invention, therefore, realizes high-speed data transmission to a removable card in a set device having a card host LSI without hindering the decrease in size and weight.

A first aspect of the present invention provides a set device having a function for controlling at least one of a removable card complying with predetermined card bus specifications and an embedded module complying with the predetermined card bus specifications, including: a microcomputer module having a master function of the predetermined card bus specifications; a card host LSI having a master function and a slave function of the predetermined card bus specifications; a first card bus, complying with the predetermined card bus specifications, for connecting the microcomputer module to the card host LSI; and a second card bus, complying with the predetermined card bus specifications, for connecting the card host LSI to the removable card or the embedded module.

According to the first aspect, the card host LSI and a removable card or an embedded module complying with the predetermined card bus specifications are connected by the card bus complying with the predetermined card bus specifications. Also the microcomputer module and the card host LSI are connected by the card bus complying with the predetermined card bus specifications. That is to say, the microcomputer module and the card host LSI that have been conventionally connected by an IO bus are connected by the card bus. As a result, a high-speed access to the removable card or the embedded module is enabled without depending on the performance of the IO bus (load capacity, bandwidth, and access speed). That is to say, the high-speed data transmission can be realized without hindering the reduction in size and weight of the set device.

Since even the microcomputer module without an IO bus or a free space can be connected to the card host LSI by the card bus, the removable card and the embedded module can be used. Further, since a number of signal lines of the card bus is normally smaller than that of the IO bus, the use of the card bus can reduce the number of terminals of the card host LSI.

The use of the card bus for the connection between the microcomputer module and the card host LSI widens general versatility of the microcomputer module. As a result, function enhancement suitable for the dissemination devices, the middle-class devices and the high-class devices becomes easy.

In the set device from the first aspect, it is preferable that the card host LSI has a bus switch, and the bus switch is configured to switch between a first mode using the master function of the card host LSI as a master function of the second card bus and a second mode using the master function of the microcomputer module as the master function of the second card bus according to a card bus command from the microcomputer module.

As a result, the master function of the microcomputer module and the master function of the card host LSI can realize commoditizing of sources and functions. Further, the mode is switched during standby of the process for the removable card, so that parallel processes can be executed, thereby improving the performance.

It is preferable that the set device from the first aspect has a second card host LSI having a master function and a slave function of the predetermined card bus specifications, and a third card bus, complying with the predetermined card bus specifications, for connecting the card host LSI to the second card host LSI.

As a result, since the second card host LSI can be used as a repeater, a physical distance between the microcomputer module and the removable card or the like can be prolonged. Therefore, a conventional problem such that a wiring length up to the removable card or the like cannot be prolonged due to restriction of the load capacity (data delay time) of the card bus can be solved.

In the set device from the first aspect, it is preferable that the first card bus has a command line and a data line, and when the microcomputer module controls a register in the card host LSI via the first card bus, the microcomputer changes a control flag, a register address and writing or reading data into frames of predetermined number of bits, and continuously transmits the frames to the data line of the first card bus.

As a result, continuous random access to the register is enabled, and a number of command issuing times is reduced, thereby improving the speed of communication with the outside.

Further, it is preferable that a stuff bit is provided between the control flag and the register address in at least one of data formats of the frames. As a result, since the stuff bit can be used not only for flag expansion but also for bit expansion of an address, the stuff bit can be compatible with both future flag expansion and address expansion.

It is preferable that at least one of data formats of the frames is provided with an end flag that shows whether the frame is a last frame in a current command. Due to the end flag, a number of frames to be set does not have to be specified in advance. For this reason, an end process of the register setting command can be executed in a simple circuit with a load of the microcomputer module being small.

It is preferable that at least one of data formats of the frames is provided with a debug flag that shows whether a data log of the frame is stored. As a result, a necessary frame is selected so that an access log can be obtained. For example, this is effective particularly for debug at the time of development.

It is preferable that at least one of data formats of the frames includes a source address, bit width information and a destination address, and "0" as the bit width information shows a function for copying data about the source address to the destination address. As a result, the flag information bit can be utilized efficiently.

It is preferable that the card host LSI has a master function for a plurality of card buses and has a plurality of registers corresponding to the card buses, and at least one of data formats of the frames is provided with a selection flag for selecting all or some of the plurality of registers as a register in which writing is performed. As a result, since simultaneous writing can be performed in all or some of the plurality of registers, a rest command or the like can be simultaneously issued for a plurality of cards, thereby shortening initializing time.

It is preferable that the frame is composed of $2^N$ (N: natural number) bits.

In the set device from the first aspect, it is preferable that the card host LSI has an inverting unit for inverting a clock on a signal path through which the clock input via the first card bus is output via the second card bus.

As a result, since the input clock is inverted and output, a change in a clock duty caused by "a difference between a high driving power and a low driving power" due to a difference in characteristics between Pch and Nch of the transistor can be repressed. This constitution is effective particularly for the case where the card host LSI is cascade-connected and a clock from the microcomputer module is used.

In the set device from the first aspect, it is preferable that a third card bus for connecting the microcomputer module and the card host LSI together is provided separately from the first card bus, and the card host LSI has a function for changing over between control via the first card bus and control via the third card bus.

It is preferable that the card host LSI is configured to handle a plurality of the second card buses and has a function for changing over between control via the first card bus and control via the third card bus for each of the second card buses.

In the set device from the first aspect, the card host LSI may convert data transmitted from the card host LSI according to a card bus command from the microcomputer module.

A second aspect of the present invention provides a card host LSI to be used in a set device having a function for controlling at least one of a removable card complying with predetermined card bus specifications and an embedded module complying with the predetermined card bus specifications, including: a master function and a slave function of the predetermined card bus specifications wherein, the card host LSI is configured to be connected to a first card bus, complying with the predetermined card bus specifications, for connecting the card host LSI to a microcomputer module; and the card host LSI is configured to be connected to a second card bus, complying with the predetermined card bus specifications, for connecting the card host LSI to the removable card or the embedded module.

It is preferable that the card host LSI from the second aspect has a bus switch, and the bus switch is configured to switch between a first mode using the master function of the card host LSI as a master function of the second card bus and a second mode using a master function of the microcomputer module connected via the first card bus as a master function of the second card bus according to a card bus command input via the first card bus.

It is preferable that in the first mode, data transmitted from the card host LSI is converted according to the card bus command input via the first card bus.

It is preferable that the card host LSI from the second aspect has an inverting unit for inverting a clock on a signal path through which the clock input via the first card bus is output via the second card bus.

In the card host LSI from the second aspect, it is preferable that separately from the first card bus, the card host LSI is configured to be connected to a third card bus for connecting the card host LSI to the microcomputer module, and the card host LSI has a function for changing over between control via the first card bus and control via the third card bus.

A third aspect of the present invention provides a set device having a function for controlling at least one of a removable card complying with predetermined card bus specifications and an embedded module complying with the predetermined card bus specifications, including: a microcomputer module having a master function of the predetermined card bus specifications; a card host LSI having a master function and a slave function of the predetermined card bus specifications; a peripheral device, having a slave function of the predetermined card bus specifications, which is any one of a communication device, a storage device, a GPS (Global Positioning System) device and an imaging device; a first card bus, complying with the predetermined card bus specifications, for connecting the microcomputer module to the card host LSI; and a second card bus, complying with the predetermined card bus specifications, for connecting the microcomputer module to the peripheral device.

According to the third aspect, the microcomputer module and the card host LSI are connected by the card bus complying with the predetermined card bus specifications. That is to say, the microcomputer module and the card host LSI, that are connected conventionally by an IO bus, are connected by the card bus. As a result, a high-speed access to the removable card or the embedded module is enabled without depending on the performance of the IO bus (load capacity, bandwidth and access speed). That is to say, the high-speed transmission can be realized without hindering the reduction in size and weight of the set device.

The peripheral device, that is any one of a communication device, a storage device, a GPS device and an imaging device, and the microcomputer module are connected by the card bus complying with the predetermined card bus specifications. That is to say, not only the removable card or the like but also a peripheral function of USB or the like can be controlled by the card bus.

Even the microcomputer module without an IO bus or a free space can use the removable card and the embedded module by means of the card bus, and can use the peripheral function by means of the card bus. Further, since a number of signal lines of the card bus is normally smaller than that of the IO bus, a number of terminals of the card host LSI can be reduced by using the card bus.

When the card bus is used for the connection between the microcomputer module and the card host LSI or the peripheral device, the general versatility of the microcomputer module is widened. As a result, the function enhancement suitable for the dissemination devices, the middle-class devices and the high-class devices becomes easy.

In the future, it is assumed that peripherals such as memories (for example, 27a and 27b in FIG. 14) are embedded in the microcomputer module or a multi-chip module in which the peripheral and the microcomputer module are embedded into one package as a plurality of pair chips is realized in order to realize the reduction in size and weight and the reduction in price. In such a manner, it is considered that an IO bus itself is possibly eliminated from the set device. On the other hand, since data is carried with respect to a stationary device such as a DVD recorder or between portable devices, it is considered that even the portable device such as a cellular phone terminal is shipped with an interface of small card media. The present invention is devised in view of such a future vision.

According to the respective aspects of the present invention, since the microcomputer module and the card host LSI are connected by the card bus, the high-speed access to the removable card or the embedded module is enabled. That is to say, the high-speed data transmission can be realized without hindering the reduction in size and weight of the set device.

BRIEF DESCRIPTION OF THE DRAWINGS

FIG. 5 is a diagram illustrating a command of a register through mode;

FIGS. 6A to 6D are diagrams illustrating command protocols in the register through mode, FIG. 6A illustrates a register setting command, FIG. 6B illustrates a register reading command, FIG. 6C illustrates a buffer writing/reading command, and FIG. 6D illustrates a mode setting command;

FIG. 7A illustrates a data format of the register setting command, FIG. 7B illustrates a reading expansion data format of the register setting command, and FIG. 7C illustrates a writing expansion data format of the register setting command;

DETAILED DESCRIPTION

First Embodiment

Figure 1:
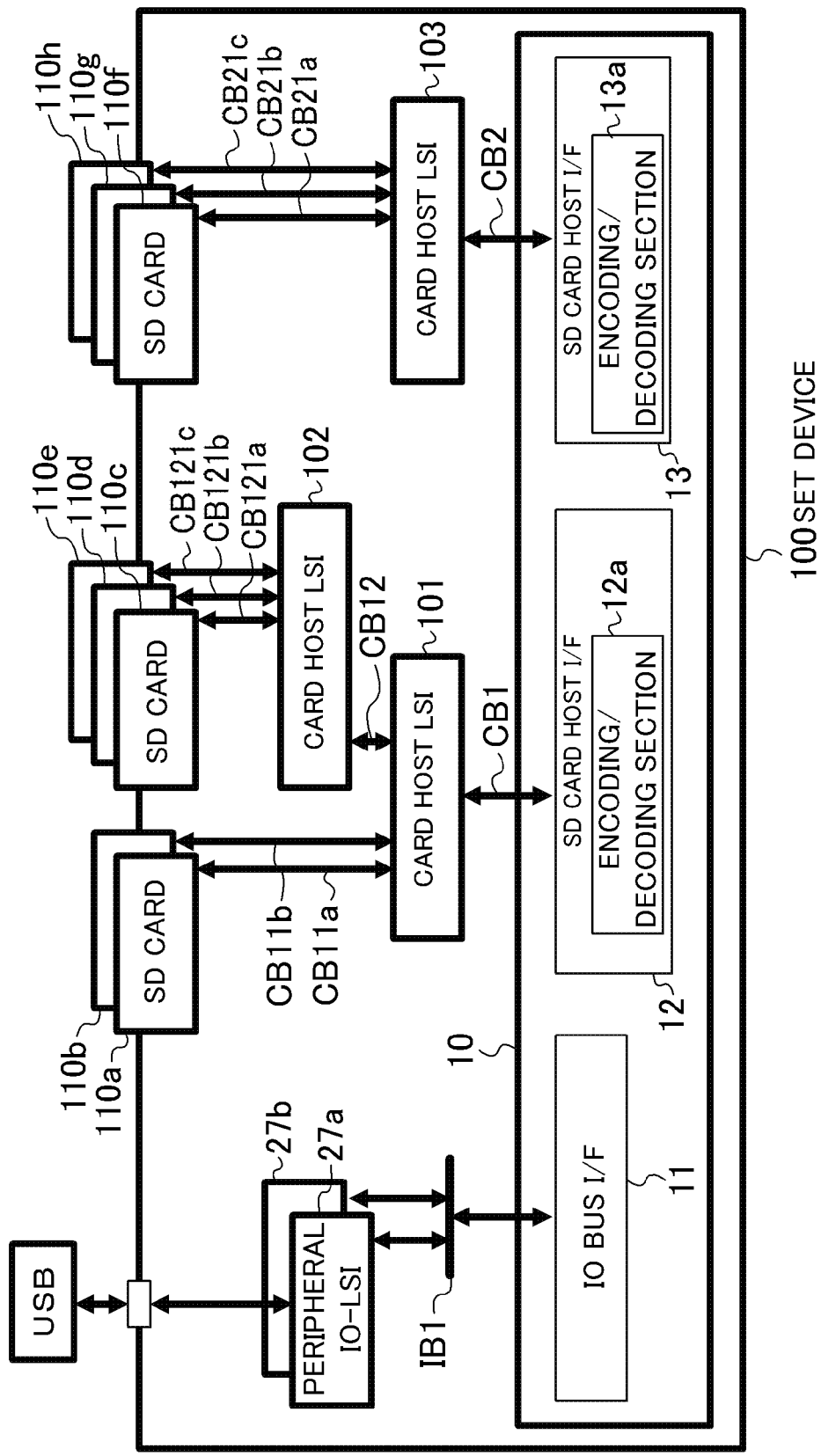
FIG. 1 is a constitutional diagram of a set device according to a first embodiment.

FIG. 1 is a constitutional diagram of a set device according to a first embodiment. The set device according to the first embodiment has a function for controlling an SD card as one example of a removable card and an embedded module complying with card bus specifications for SD cards. The set device is, for example, a cellular phone terminal.

As shown in FIG. 1, the set device 100 contains a main microcomputer LSI 10 as a microcomputer module, peripheral IO-LSIs 27a and 27b, and card host LSIs 101, 102 and 103. The main microcomputer LSI 10 contains an IO bus I/F 11, an SD card host I/F 12 having an encoding/decoding section 12a, and an SD card host I/F 13 having an encoding/decoding section 13a.

The IO bus I/F 11 is connected to the peripheral IO-LSIs 27a and 27b via an IO bus IB1. The peripheral IO-LSIs 27a and 27b are connected to a peripheral device such as USB.

The SD card host I/Fs 12 and 13 function as masters complying with the card bus specifications for SD cards. The SD card host I/F 12 is connected to a card host LSI 101 that functions as a slave via a card bus CB1 as a first card bus. Further, the SD card host I/F 13 is connected to a card host LSI 103 that functions as a slave via a card bus CB2.

The card host LSIs 101, 102 and 103 function also as masters complying with the card bus specifications for SD cards, and can be connected to a plurality of card buses. The card host LSI 101 is connected to a plurality of SD cards 110a and 110b that function as slaves via card buses CB11a and CB11b as second card buses, and is connected to the card host LSI 102 as a second card host LSI that functions as a slave via a card bus CB12 as a third card bus. The card host LSI 102 is connected to a plurality of SD cards 110c, 110d and 110e that function as slaves via card buses CB 121a, 121b and 121c. The card host LSIs 101 and 102 compose cascade connection (daisy chain). On the other hand, the card host LSI 103 is connected to a plurality of SD cards 110f, 110g and 110h that function as slaves via card buses CB21a, CB21b and CB21c.

Figure 2:
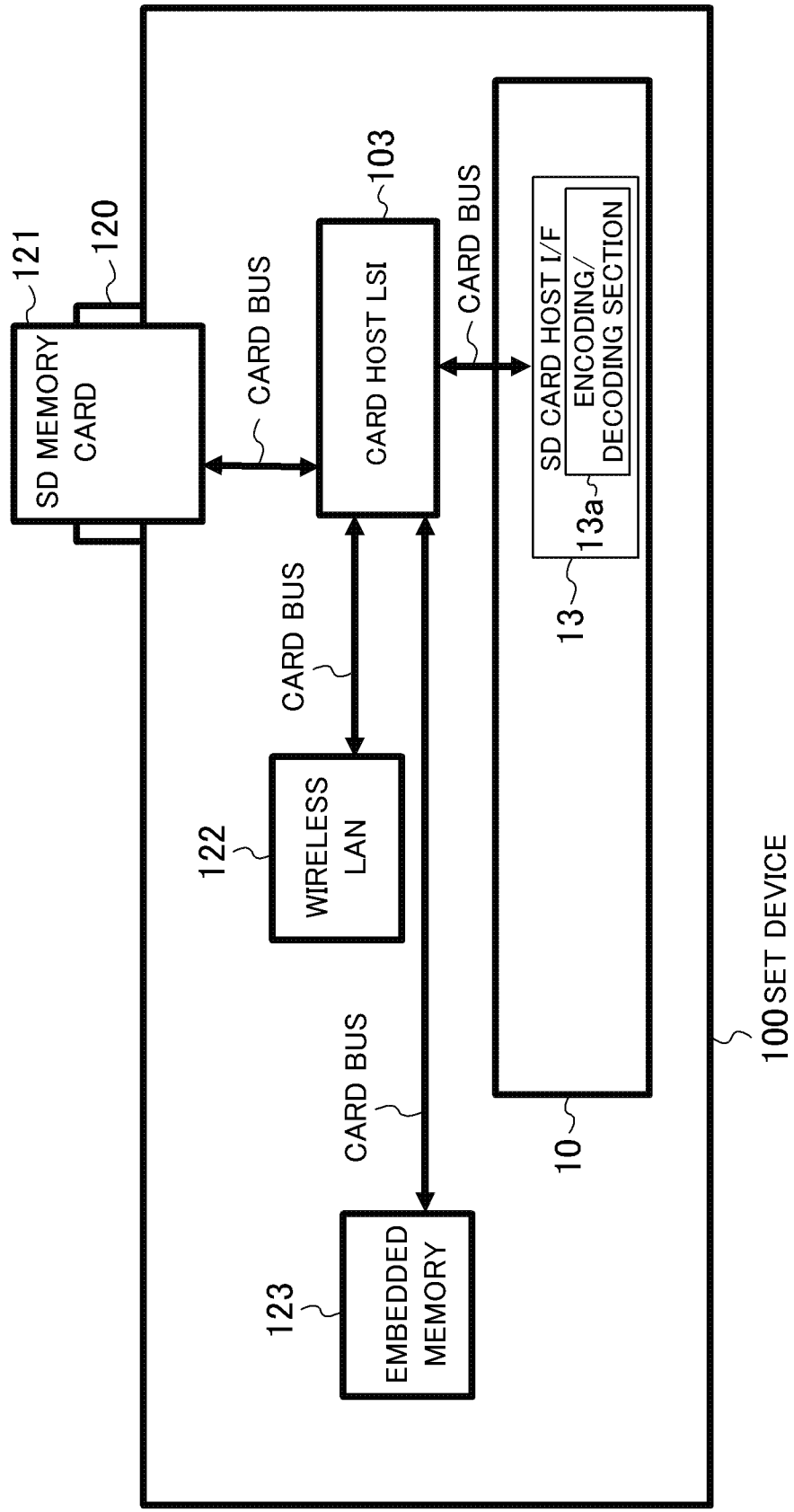
FIG. 2 is a diagram illustrating examples of a removable card and an embedded module.

"SD card" in FIG. 1 may be an SD memory card 121 (or SD I/O card or the like) inserted into a slot portion 120 provided to the set device 100 or an embedded module such as a wireless LAN module 122 or an embedded memory 123 embedded into the set device as shown in FIG. 2. The same holds for second and third embodiments, described later.

The card buses shown in FIG. 1 comply with the card bus specifications for SD cards as predetermined card bus specifications. The card bus specifications define a signal line structure of buses and protocols of a physical layer. The same holds for the second and third embodiments, described later.

Figure 3:
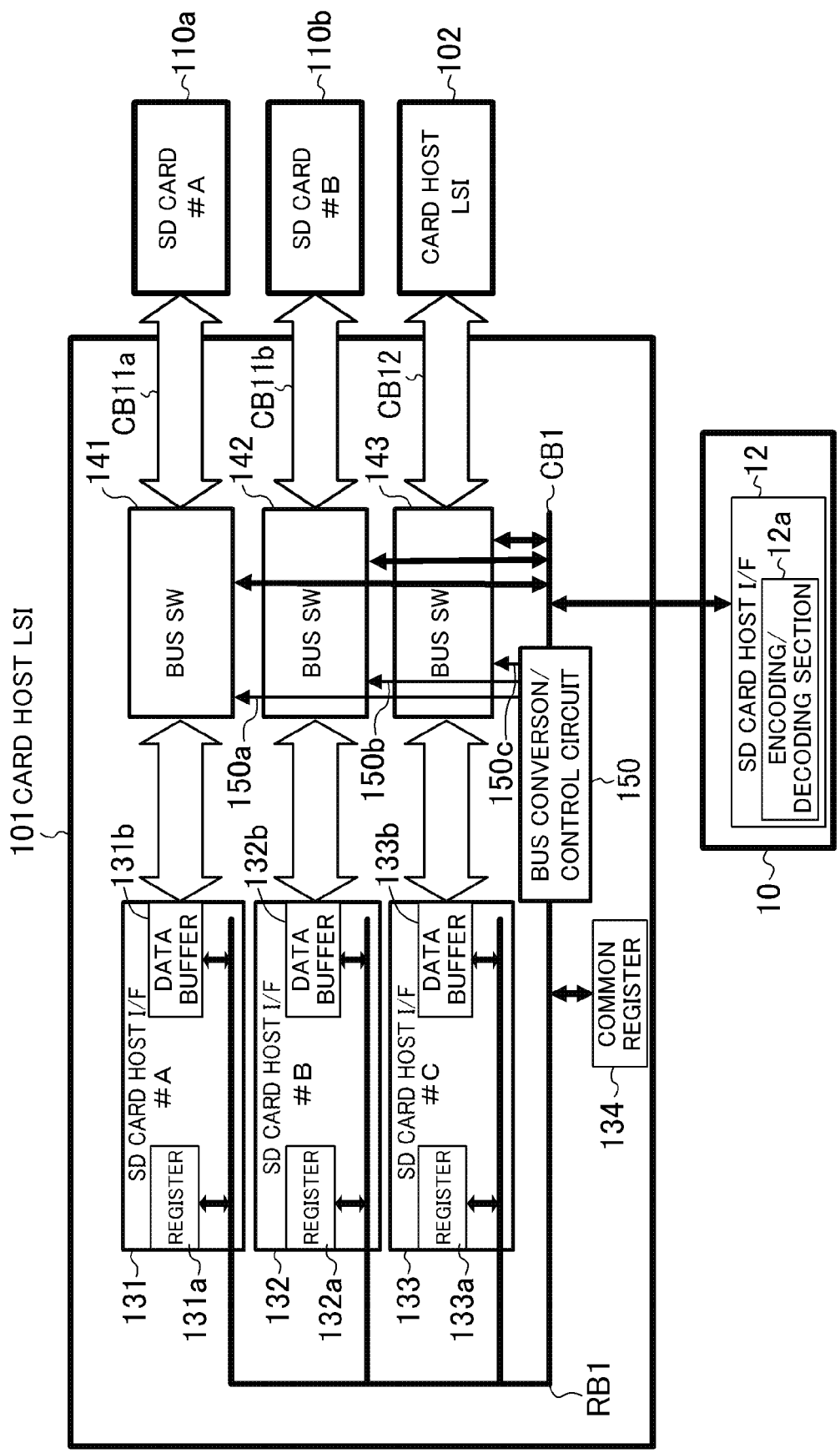
FIG. 3 is a detailed constitutional diagram of a card host LSI and its peripheral circuit in FIG. 1.

FIG. 3 is a detailed constitutional diagram of the card host LSI and its peripheral circuit in FIG. 1. Since the card host LSIs 101, 102 and 103 have the same constitution, FIG. 3 illustrates the card host LSI 101 as representative. The components common with those in FIG. 1 are denoted by the same reference symbols, and detailed description thereof is omitted.

As shown in FIG. 3, the card host LSI 101 contains SD card host I/Fs 131, 132 and 133, bus switches 141, 142 and 143, a bus conversion/control circuit 150, and a common register 134 for entirely controlling the card host LSI 101 in such a manner that reset of each block is controlled. The common register 134 stores data and log information pre-read by a register setting command, described later. The SD card host I/Fs 131, 132 and 133 contain registers 131a, 132a and 133a for storing commands from the SD card host I/F 12, and FIFO-structured data buffers 131b, 132b and 133b, respectively.

An operation in the case where the SD cards 110a and 110b, and the SD cards 110c, 110d and 110e to be connected to the card host LSI 102 are low-speed is described below with reference to FIGS. 1 and 3.

When data is read into the SD card 110a, "a register setting command" (described later) is issued by the SD card host I/F 12, and is written into the register 131a in the SD card host I/F 131 via the card bus CB1, the bus conversion/control circuit 150 and a register bus RB1. The SD card host I/F 131 issues a reading command to the SD card 110a via the bus switch 141 and the card bus CB11a (hereinafter, register through mode).

The data and the response read from the SD card 110a are temporarily stored in the data buffer 131b and the register 131a in the SD card host I/F 131 via the card bus CB11a and the bus switch 141, respectively. The SD card host I/F 12 issues "a data buffer #A reading command" (described later), and "a register setting command/register reading command" (described later), so that the stored data and response are transferred to the SD card host I/F 12 via the register bus RB1, the bus conversion/control circuit 150 and the card bus CB1.

Also when the commands are issued to the SD cards 110b, 110c, 110d and 110e, the similar processing flow is executed.

The above describes the case of the data reading, but in the case of data writing, the SD card host I/F 12 issues "the register setting command", and the SD card host I/F 131 issues a writing command to the SD card 110a. Thereafter, SD card host I/F 12 issues "a data buffer #A writing command" (described later), so that data is written into the data buffer 131b in the SD card host I/F 131 and is transferred to the SD card 110a.

Since the SD cards 110a, 110b, 110c, 110d and 110e are low-speed, waiting time continues until data is read. During this time, the similar commands are issued for the SD card host I/Fs 132 and 133, so that a parallel process can be executed. When switch selecting signals 150a, 150b and 150c are output from the bus conversion/control circuit 150 to the bus switches 141, 142 and 143, so that the switching of the buses is controlled and the parallel process can be executed.

An operation in the case of an access to cipher data in the SD card 110a is described. The SD card host I/Fs 131, 132 and 133 in the card host LSI 101 do not have an encoding/decoding section, and the SD card host I/F 12 in the main microcomputer LSI 10 has the encoding/decoding section 12a.

The command and data issued by the SD card host I/F 12 are transferred directly to the SD card 110a via the card bus CB1, the bus switch 141 and the card bus CB11a (hereinafter, a direct through mode). The data and response read from the SD card 110a are transferred to the SD card host I/F 12 via the card bus CB11a, the bus switch 141 and the card bus CB1.

Also when commands are issued to the SD cards 110b, 110c, 110d and 110e, the similar processing flow is executed.

That is to say, the bus switches 141, 142 and 143 can change over between a first mode (register through mode) using a master function of the card host LSI 101 as a master function of the card buses CB11a, CB11b and CB12 and a second mode (direct through mode) using a master function of the main microcomputer LSI 10 as the master function of the card buses CB11a, CB11b and CB12 according to a card bus command from the main microcomputer LSI 10. At the time of the register through mode, the card host LSI 101 converts transmitted data from the card host LSI 101 according to the card bus command from the main microcomputer LSI 10 in order to meet with protocols. The transmitted data is preferably converted also in a constitution where the bus switches 141, 142 and 143 are not provided and the similar operation to the register through mode is performed without the mode switching.

Figure 4:
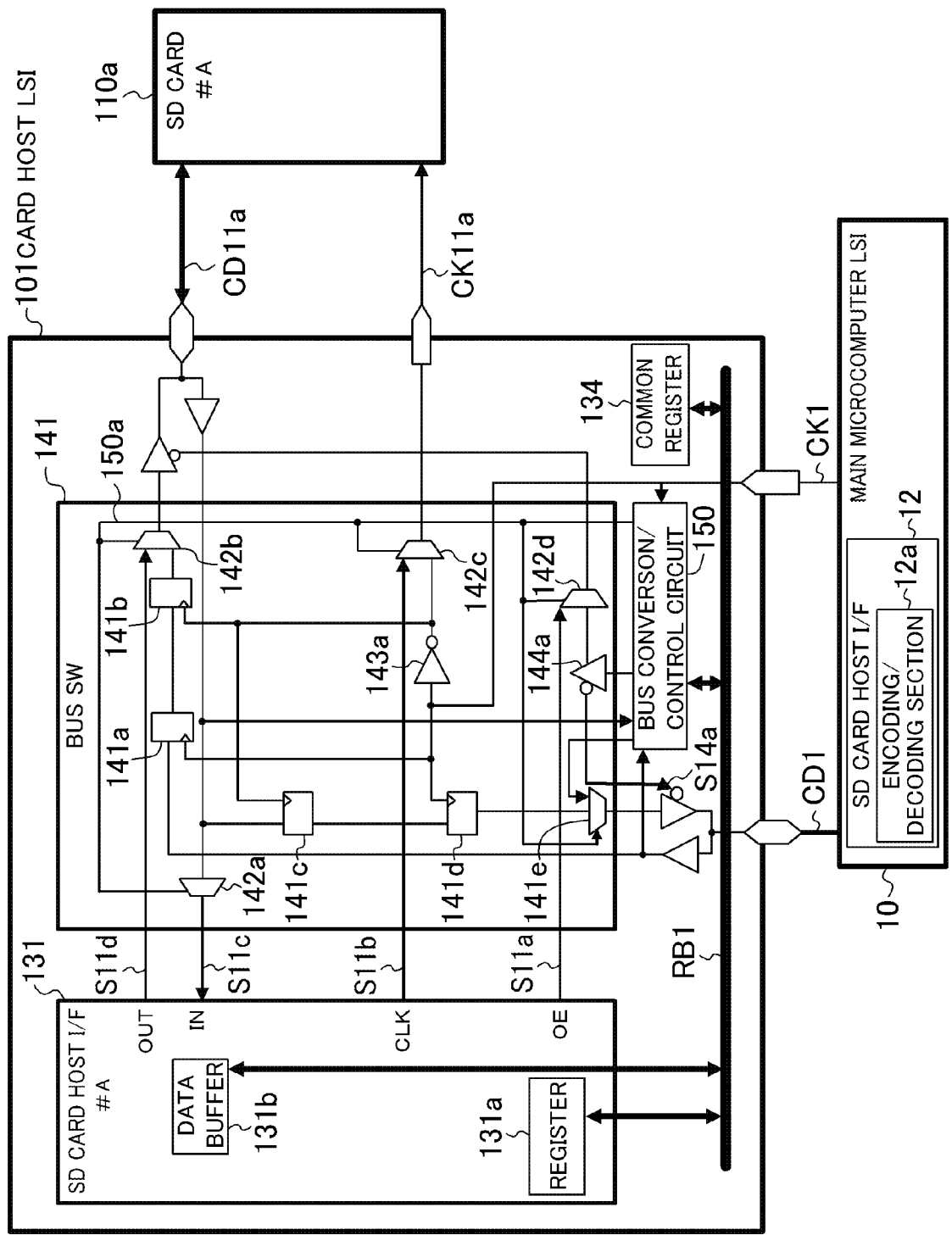
FIG. 4 is a detailed constitutional diagram of a bus switch and its peripheral circuit in FIG. 3.

FIG. 4 is a detailed constitutional diagram illustrating the bus switches and their peripheral circuit in FIG. 3. Since the bus switches 141, 142 and 143 have the same constitution, FIG. 4 illustrates the bus switch 141 as representative. The components common with those in FIGS. 1 and 3 are denoted by the same symbols, and their detailed description is omitted. Signal lines for some signals are denoted by the same symbols as the signals.

As shown in FIG. 4, the bus switch 141 is connected to the SD card host I/F 12 in the main microcomputer LSI 10 via the command/data bus CD1 and a clock signal line CK1. The bus switch 141 is further connected to the SD card 110a via the command/data bus CD11a and a clock signal line CK11a.

An operation of the bus switch 141 is described below with reference to FIGS. 1, 3 and 4.

In the register through mode, the command and data issued by the SD card host I/F 12 are stored in the register 131a and the data buffer 131b in the SD card host I/F 131, respectively, via the command/data bus CD1, the bus conversion/control circuit 150 and a register bus RB1 and are input into a selector 142b (S11d). In the direct through mode, the command and data issued by the SD card host I/F 12 are input into the selector 142b via the command/data bus CD1 and flip-flops 141a and 141b. The selector 142b selects the command and data of the register through mode or the command and data of the direct through mode according to an output value of the switch selecting signal 150a. When an output enable is asserted, the selected command and data are output to the SD card 110a via the command/data bus CD11a.

The output enable is an output signal from a selector 142d. The selector 142d selects the output enable from the SD card host I/F 131 (register through mode) or the output enable generated from the command, data and the clock from the SD card host I/F 12 by the bus conversion/control circuit 150 (direct through mode) according to an output value of the switch selecting signal 150a.

In the register through mode, the response and data from the SD card 110a are stored in the register 131a and the data buffer 131b in the SD card host I/F 131, respectively, via the command/data bus CD11a and a selector 142a (S11c). Thereafter, the response and data are input from the bus conversion/control circuit 150 into a selector 141e via the register bus RB1. In the direct through mode, the response and data from the SD card 110a are input into the selector 141e via the command/data bus CD11a and flip-flops 141c and 141d.

The selector 141e selects the response and data of the register through mode or the response and data of the direct through mode according to the output value of the switch selecting signal 150a. When an output enable 514a is asserted, the selected response and data are transmitted to the SD card host I/F 12 via the command/data bus CD1. The output enable is a reversal value of a value to be output from the bus conversion/control circuit 150 to the selector 142d.

An operation of a clock at issuing the above commands is described below. In the register through mode, a clock S11b in the SD card host I/F 131 is input into a selector 142c. In the direct through mode, a clock CK1 output from the SD card host I/F 12 is input into a selector 142c via an inverter 143a. The selector 142c selects the clock of the register through mode or the clock of the direct through mode according to the output value of the switch selecting signal 150a. The selected clock is output as a clock CK11a to the SD card 110a. Particularly when the card host LSIs having the same property are cascade-connected and set into the direct through mode, one polarity (for example, "H") of the clock CK11a possibly spreads due to "a difference between a high driving power and a low driving power" caused by a difference in characteristics between Pch and Nch of the transistor. That is to say, a clock duty changes. The card host LSI 101, therefore, has the inverter 143a as an inverting unit for inverting a clock on a signal path from the input of the clock to the output of the clock. When the input clock is inverted, the change in clock duty is cancelled between the cascade-connected card host LSIs. Needless to say, the unit for inverting the clock can be easily realized by components other than the inverter. The inverter 143a is used in order to reduce the change in clock duty, but this inverter may be omitted.

According to the first embodiment, the main microcomputer LSI 10 without an IO bus or a free space contains the SD card host I/Fs 12 and 13, so that the card host LSIs 101, 102 and 103 can be connected. As a result, a plurality of small card media such as the SD cards 110a, 110b, 110c, 110d and 110e can be connected.

The speed of the data transmission does not depend on the performance of the IO bus (load capacity, a bandwidth and an access speed), so that high-speed data transmission is enabled.

When the card host LSI is controlled by a card bus with less number of terminals without using an IO bus with a lot of terminals, the number of terminals in the card host LSI can be reduced, and thus an area of the LSI can be reduced.

When the bus conversion/control circuit 150 and the bus switches 141, 142 and 143 in the card host LSIs 101, 102 and 103 switch the card buses CB11a, CB11b and CB12 connected to the small card media such as an SD card, sources such as data buffers 131b, 132b and 133b and the function of the encoding/decoding section 12a can be shared among the SD card host I/Fs 12 and 13 and the card host LSIs 101, 102 and 103. While the sequence waits for the process of the small card media such as the SD card, a parallel process can be executed so that the performance is improved.

Further, the cascade connection (daisy chain) of the card host LSIs can be structured. That is to say, the N card host LSIs are connected between the main microcomputer LSI and the small card medium such as the SD card in series, so that the card host LSIs can be used as a repeater. As a result, a physical distance between the main microcomputer LSI and the small card medium can be extended N times longer than conventional distance.

In the first embodiment, the card host LSI contains three pairs of the SD card host I/Fs and the corresponding bus switches, but the number of them is not limited to three pairs.

A one-to-one configuration is set between the bus switch and the combination of the SD card host I/F and the SD card or card host LSI, but the three bus switches may be used as cross bus switches in may-to-many configuration, and they can select the combinations of the SD card host I/Fs and the SD cards or card host LSIs.

In the constitution shown in FIG. 3 for example, the encoding/decoding section 12a may be provided into the main microcomputer LSI 10, but it may be provided into the SD card host I/Fs 131, 132 and 133 in the card host LSI 101. The encoding/decoding section may be provided into both the main microcomputer LSI 10 and the card host LSI 101. The same holds for the other embodiments.

FIG. 5 is a diagram illustrating a list of the commands in the register through mode. FIGS. 6A to 6D are diagrams illustrating command protocols in the register through mode. FIG. 6A shows a protocol of a register setting command, FIG. 6B shows a protocol of a register reading command, FIG. 6C shows a protocol of a buffer writing/reading command, and FIG. 6D shows a protocol of a mode setting command.

The commands are issued by the main microcomputer LSI 10 via the card buses CB1 and CB2. Since the card buses CB1 and CB2 perform the similar operation, the card bus CB1 is described as an example.

"The register setting command" is for setting the registers 131a, 132a, 133a and 134. 32-bit data (frames) composed of register addresses, data, and control flags for the respective addresses are transmitted from the SD card host I/F 12 to the card host LSI 101 via a data line of the card bus CB1. The SD card host I/F 131 receives frames via the bus conversion/control circuit 150 and the register bus RB1, and execute a process instructed by a control flag on a register of the address shown in the frame. The number of bits in the frame is not limited to 32 bits, but it is preferably $2^N$ (N is a natural number) bits from a viewpoint of the simplification of the circuit.

FIG. 7A is a diagram illustrating a data format of the register setting command. A bit 31 is a LastFrame flag (end flag), and shows whether the frame is a last frame in the current command. This flag is for solving the following problems:

1) When a field showing a frame size of less than 32 bits is added to a head of the frame, the frame size is not $2^N$ (N is a natural number) bits such as 32 bits, and thus the circuit becomes complicated; and 2) When a field showing a frame size of 32 bits or more is added to the head of the frame, the transmission time is double or more in the case of one-register access, and thus an overhead becomes large. Due to this end flag, the number of frames to be set does not have to be specified in advance, and a process for terminating the register setting command in a simple circuit with less load of the main microcomputer LSI 10.

Bits 30 and 29 are a RW flag showing that the frame is any one of word write, byte write and word read.

Bits 28 to 24 are Stuff bits, and are reserved for future expansion. The Stuff bits are undefined and unused bits, and are called as don't-care or reserve.

Bits 23 to 16 are addresses, and bits 15 to 0 are write data. When the RW flag shows write, data is written into the register of this address. When the RW flag shows read, the bus conversion/control circuit 150 reads data from the register of this address and stores them in a common register 134, for example (hereinafter, PreRead).

"The register reading command" is a command that is issued after the register setting command. Data that is pre-read by the register setting command (herein, stored in the common register 134) is output to the card bus CB1.

"The data buffer #A writing command" is for transmitting writing data to the card bus CB1. The data is written into the data buffer 131b in the SD card host I/F 131 (#A) via the bus conversion/control circuit 150 and the register bus RB1 by this command. The data stored in the data buffer 131b is written into the SD card 110a via the card bus CB11a by controlling the register of the SD card host I/F 131 (#A) according to the register setting command.

"The data buffer #A reading command" reads data from the data buffer 131b in the SD card host I/F 131(#A) via the bus conversion/control circuit 150 and the register bus RB1, and outputs it to the card bus CB1. The data in the data buffer 131b is read from the SD card 110a by setting the register 131a according to register setting command.

Data buffer #B writing, data buffer #B reading, data buffer #C writing and data buffer #C reading commands perform the similar operation to "the data buffer #A writing command" or "the data buffer #A reading command" on the data buffers 132b and the 133b.

In "the mode switching command", the bus conversion/control circuit 150 controls switch the selecting signals 150a, 150b and 150c so as to switch the mode between the register through mode and the direct through mode.

FIG. 7B is a diagram illustrating a reading expansion data format of the register setting command, and the Stuff bits of bits 28 to 24 shown in FIG. 7A are expanded.

Bit 28 is a Debug flag showing whether a data log of this frame is stored. For example, when the Debug flag shows "1", the data log of this frame is stored in the common register 134. In the next register reading command, not pre-read information but log information is read. As a result, a necessary frame is selected so that the access log can be obtained. The main microcomputer LSI 10 confirms that the data issued by the register setting command matches with the data read by the register reading command, so that the confirmation can be utilized for connection debug of the card bus CB1 and internal software debug of the main microcomputer LSI 10 in the original development of set systems.

Bit 27 is an EXT flag, and instructs expansion of bits 26 to 0.

Bit 26 is a TargetByte flag, and is for switching between a process of an upper byte and a process of a lower byte.

Bit 25 is a POL flag, and is for switching the corresponding bit between "0" and "1".

Bits 24 to 16 are source addresses showing reading sources of the registers to be changed.

Bits 15 to 10 are a BitPosition/BitWidth flag, and shows a bit head position and a bit width of the registers to be changed. When the bit width is 0, no bit to be changed is present, the BitWidth flag as bit width information becomes redundancy. Therefore, the BitWidth flag "0" is allocated to a function for copying register data of a source address to a destination address. As a result, the flag information bit can be efficiently utilized. When the changed bit width is "8 bits", the change can be realized by normal bite write, and thus it is not necessary to allocate "8 bits" to the BitWidth flag.

Bits 9 to 0 are destination addresses showing rewriting places of the registers to be changed.

This expansion enables data to be copied among the registers 131a, 132a and 133a, and enables the read register values to be partially changed and rewritten.

In FIG. 7A, the stuff bit is allocated to the bits 28 to 24 between the control flag and the register address, but in FIG. 7B, the flag is expanded to the bits 28 to 25, and the bit 24 is expanded to a most significant bit of the address. When the stuff bit is provided between the control flag and the register address, it can be used for any of the future flag expansion and address expansion.

FIG. 7C is a diagram illustrating a writing expansion data format of the register setting command, namely, expansion of the stuff bit of the bits 28 to 24 shown in FIG. 7A.

Bits 28 and 27 are a Debug flag and an EXT flag and their contents are similar to those in FIG. 7B.

Bits 26 to 24 are TargetIf flag, namely, a selection flag for simultaneously writing into the register 131a, 132a and 133a of the SD card host I/Fs 131, 132 and 133.

Bits 23 to 0 are the same as FIG. 7A.

This expansion enables simultaneous register setting for the SD card host I/Fs 131, 132 and 133, and thus the number of frames in one register setting command can be reduced, and a command for simultaneously resetting can be issued for the SD cards 110a, 110b and 110c. Therefore, a plurality of SD cards can be simultaneously processed, and initializing time can be shortened.

Figure 8:
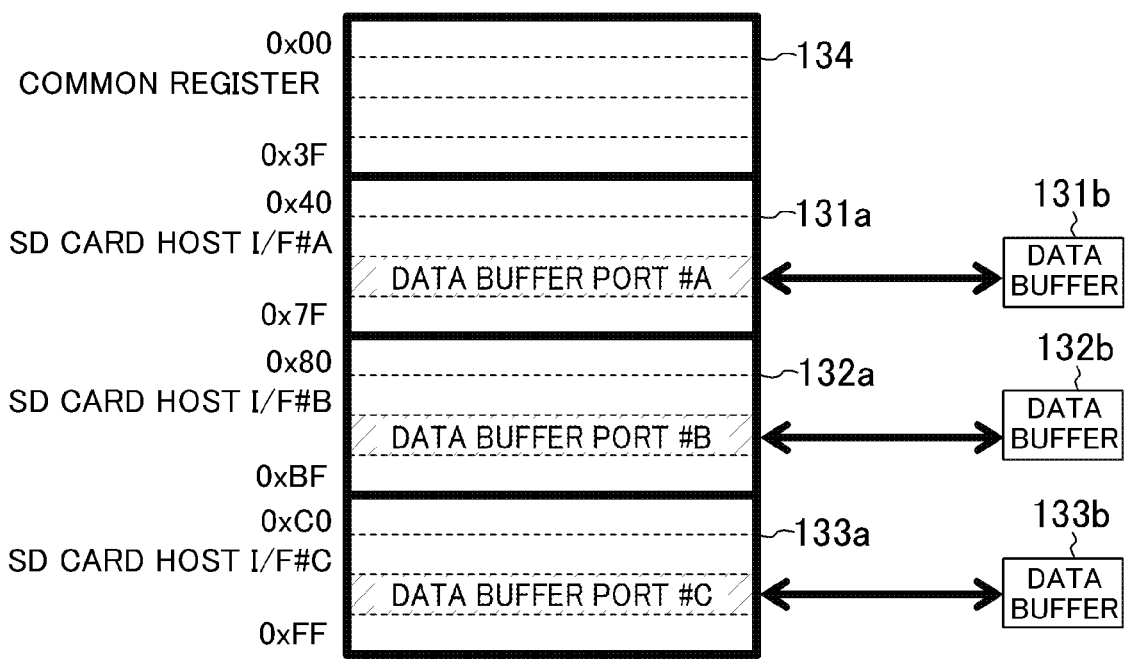
FIG. 8 is a diagram illustrating a register map of the card host LSI.

FIG. 8 is a diagram illustrating a register map of the card host LSI. FIG. 8 illustrates address spaces on the register bus RB1. The common register 134 is assigned to an address 0×00 to 0×3F, the register 131a of the SD card host I/F#A is assigned to an address 0×40 to 0×7F, the register 132a of the SD card host I/F#B is assigned to an address of 0×80 to 8×BF, and the register 133a of the SD card host I/F#C is assigned to an address 0×C0 to 0×FF. Further, the data buffers 131b, 132b and 133b are connected as FIFO via a data buffer port as one address in the registers 131a, 132a and 133a.

Second Embodiment

Figure 9:
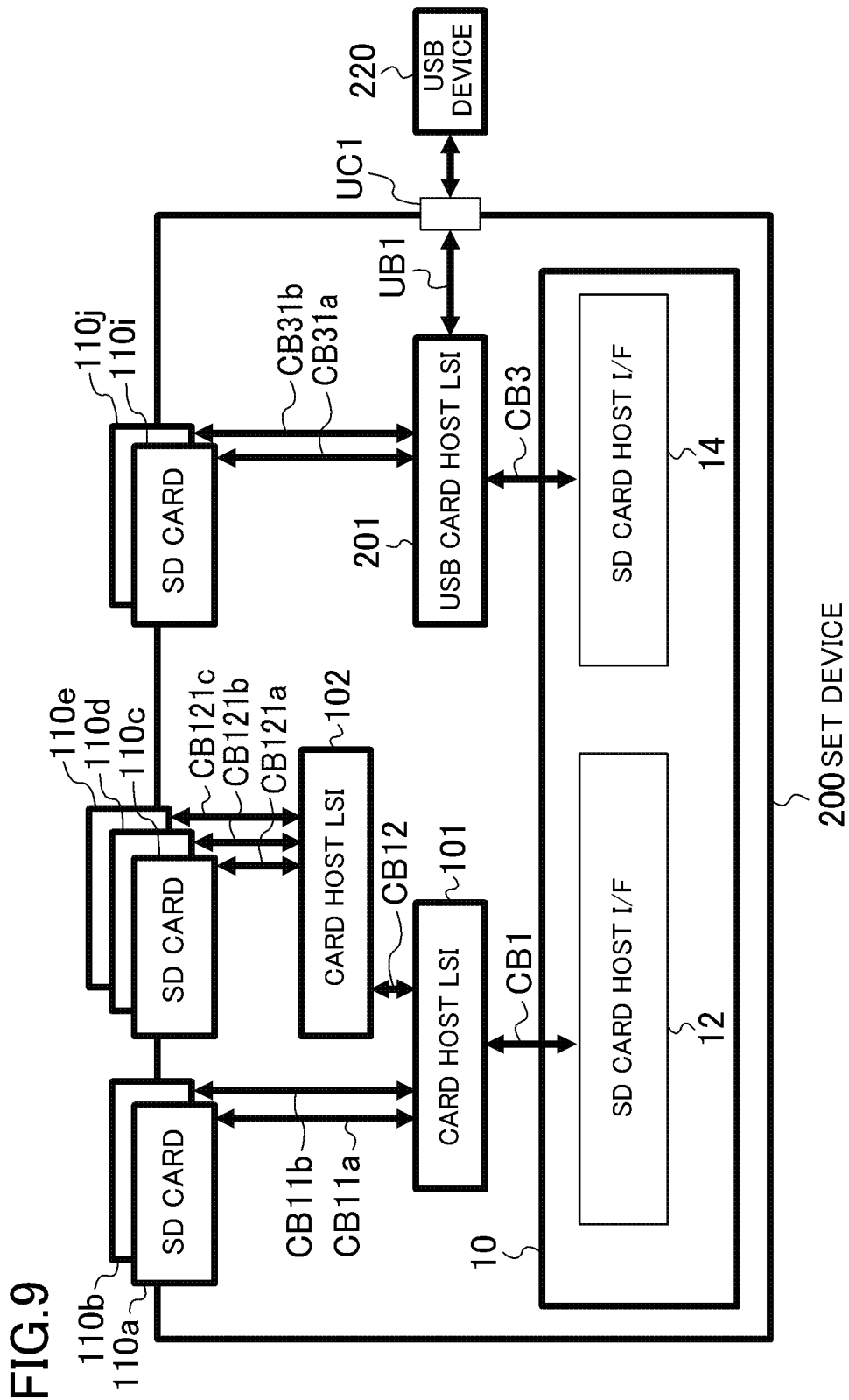
FIG. 9 is a constitutional diagram illustrating the set device according to a second embodiment.

FIG. 9 is a constitutional diagram illustrating a set device 200 according to a second embodiment. Similarly to the first embodiment, the set device according to the second embodiment also has a function for controlling the SD card as one example of the removable card and the embedded module complying with the card bus specifications for SD cards.

As shown in FIG. 9, the set device 200 contains the main microcomputer LSI 10 as the microcomputer module, the card host LSIs 101 and 102 and a USB card host LSI 201. The main microcomputer LSI 10 contains the SD card host I/Fs 12 and 14.

The SD card host I/Fs 12 and 14 function as master of the card bus specifications for SD cards. The SD card host I/F 12 is connected to the card host LSI 101 that functions as a slave via the card bus CB1 as a first card bus. The SD card host I/F 14 is connected to the USB card host LSI 201 as a peripheral device that functions as a slave via a card bus CB3 as a second card bus.

The card host LSIs 101 and 102 and the USB card host LSI 201 function also as masters of the card bus specifications for SD cards, and can be connected to a plurality of card buses. The card host LSI 101 is connected to a plurality of SD cards 110a and 110b that function as slaves via the card buses CB11a and CB11b, and is connected to the card host LSI 102 that function as a slave via another card bus CB12. The card host LSI 102 is connected to a plurality of SD cards 110c, 110d and 110e that function as slaves via the card bus CB 121a, 121b and 121c. On the other hand, the USB card host LSI 201 is connected to a plurality of SD cards 110i and 110j that function as slaves via the card buses CB31a and CB31b. The USB card host LSI 201 can be connected to a USB device 220 via the USB bus UB1 and a USB connector UC1.

That is to say, in the set device 200, the USB card host LSI 201 as a communication device is connected to the main microcomputer LSI 10 via a card bus CB3. As a result, an IO bus is eliminated in the set device 200.

Figure 10:
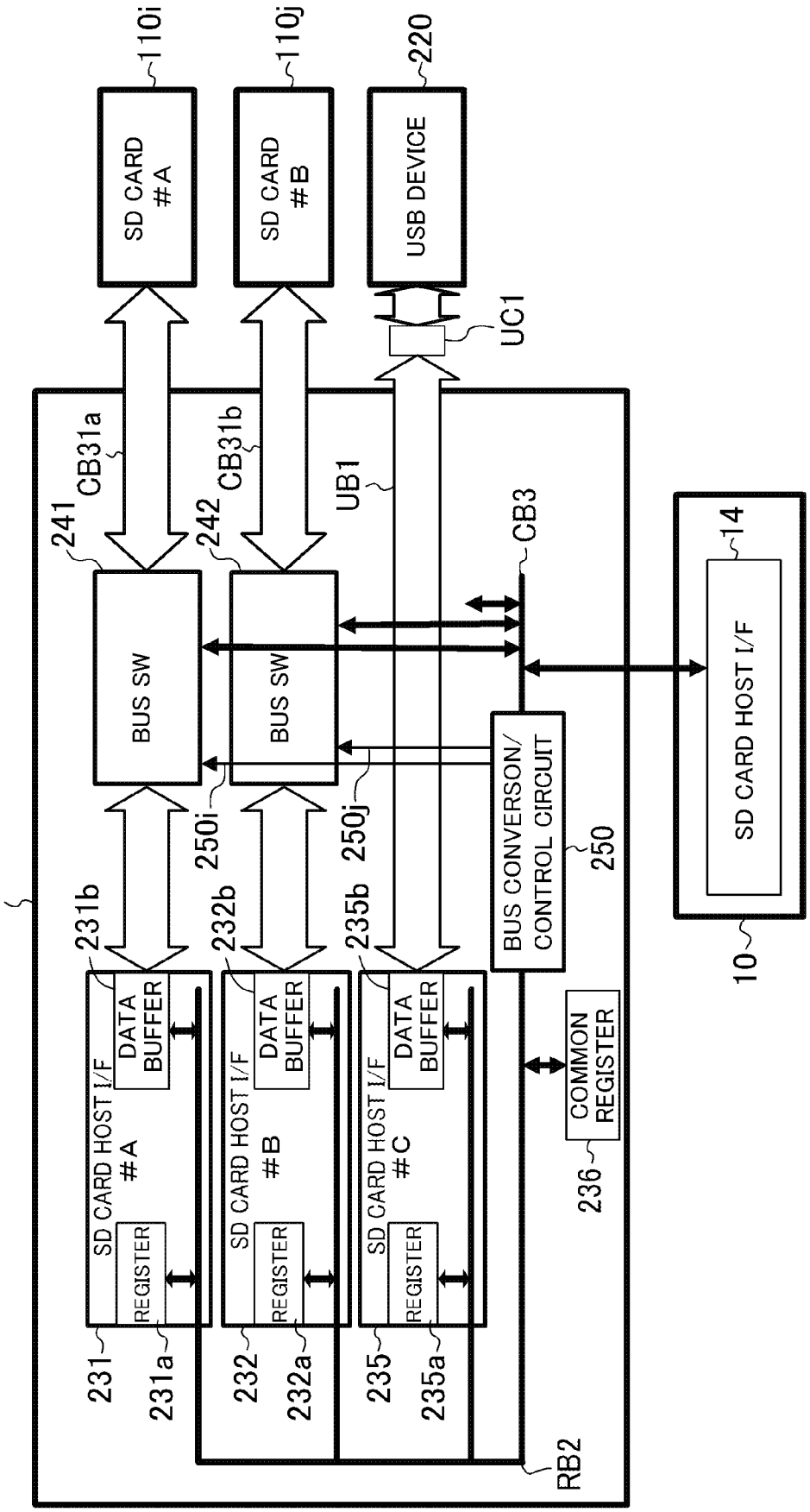
FIG. 10 is a detailed constitutional diagram of a USB card host LSI and its peripheral circuit in FIG. 9.

FIG. 10 is a detailed constitutional diagram illustrating the USB card host LSI 201 and a peripheral circuit in FIG. 9. The USB card host LSI 201 contains two SD card I/Fs 231 and 232 and one USB host I/F 235. The USB card host LSI 201 is different from the card host LSI 101 shown in FIG. 3 in that it contains the USB host I/F instead of one SD card host I/F. That is to say, the USB card host LSI 201 contains the SD card host I/Fs 231 and 232, a USB host I/F 235, bus switches 241 and 242, a bus conversion/control circuit 250, and a common register 236 for entirely controlling the USB card host LSI 201 such as reset control of each block. The SD card host I/Fs 231 and 232 and the USB host I/F 235 contain registers 231a, 232a and 235a that store commands or the like from the SD card host I/F 14, and data buffers 231b, 232b and 235b having an FIFO structure, respectively. An operation of the USB host I/F 235 is described below. Since the operation of the SD card I/Fs 231 and 232 is similar to that of the SD card host I/Fs 131 and 132 shown in FIG. 3, description thereof is omitted.

When a data reading command is issued for the USB device 220, the command issued by the SD card host I/F 14 is written into the register 235a in the USB host I/F 235 via the card bus CB3, the bus conversion/control circuit 250 and the register bus RB2. The USB host I/F 235 issues a command to USB device 220 via the USB bus UB1 and the USB connector UC1.

When data is read from the USB device 220, the data is temporarily stored in the data buffer 235b in the USB host I/F 235 via the USB connector UC1 and the USB bus UB1. The data is read to the SD card host I/F 14 via the register bus RB2, the bus conversion/control circuit 250 and the card bus CB3.

With this constitution, the main microcomputer LSI 10 controls the USB host I/F 235 in the USB card host LSI 201 using the card bus CB3, so that the data in the USB device 220 can be read.

In the second embodiment, the main microcomputer LSI and the USB card host LSI as the communication device are connected via the card bus, but the present invention is not limited to this. For example, the second embodiment describes the USB as an example, but a communication device using another communication standards such as ATA or Bluetooth may be connected via the card bus. In another manner, a storage device such as an embedded flash memory or DRAM, a GPS device using a so-called GPS (Global Positioning System) function, or an imaging device such as a camera may be connected to the main microcomputer LSI via the card bus.

Third Embodiment

The card host LSI 101 according to the first embodiment is controlled from the main microcomputer LSI 10 only via the card bus CB1. However, each of the SD card host I/Fs 131, 132 and 133 has a selector for switching between the register bus RB1 and the conventional IO bus IB2, so that the card host LSI may be controlled via the IO bus IB2. With this constitution, when the SD card host I/F 12 is slow, the card host LSI 101 can be controlled by using the IO bus IB2. Further, by simultaneously using the card bus CB1 and the IO bus IB2, for example, the SD card 110a can be controlled from the card bus CB1 in the direct through mode or the register through mode and the SD card 110b can be controlled from the IO bus IB2 via the SD card host I/F 132.

Figure 11:
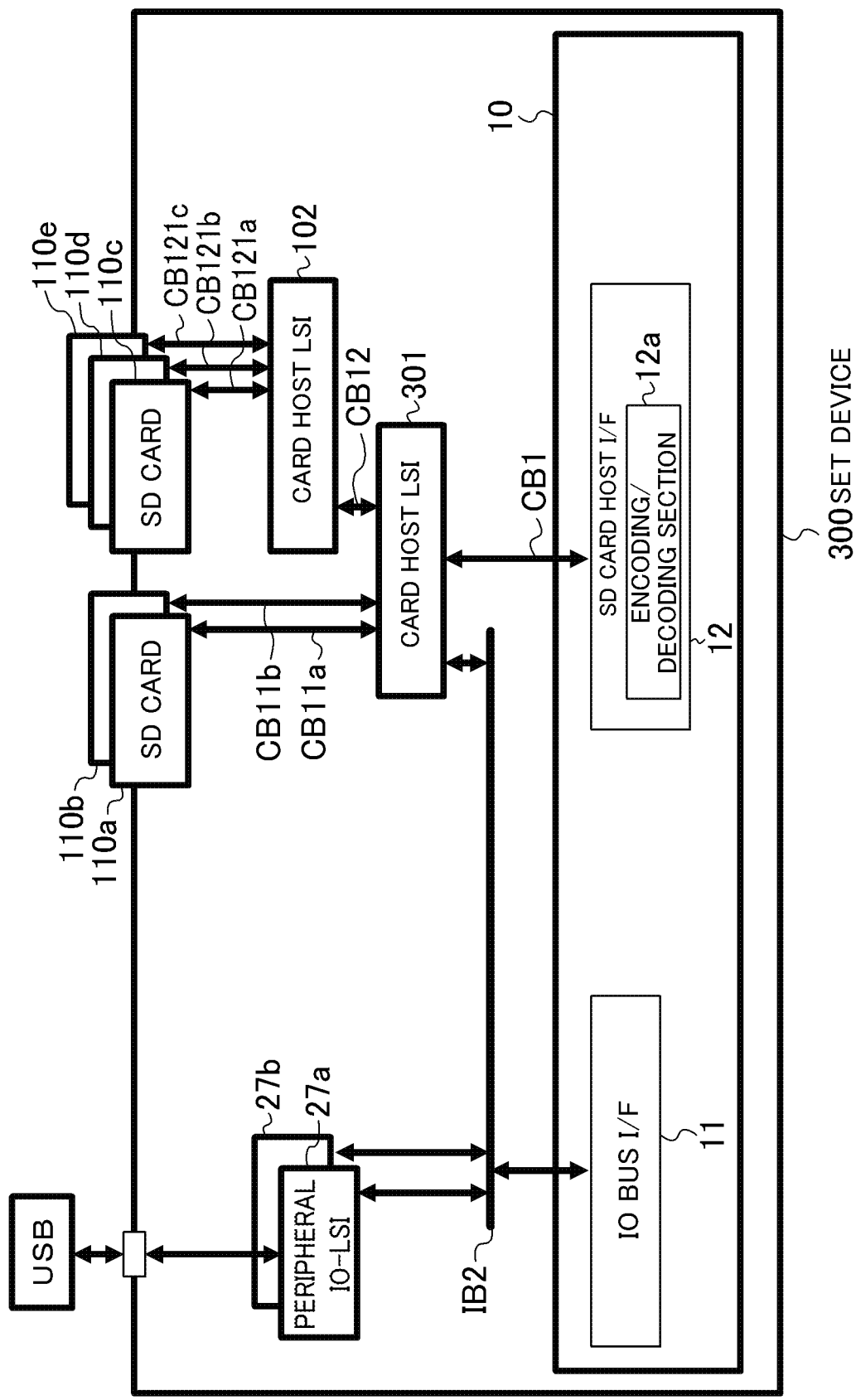
FIG. 11 is a constitutional diagram illustrating the set device according to a third embodiment.
Figure 12:
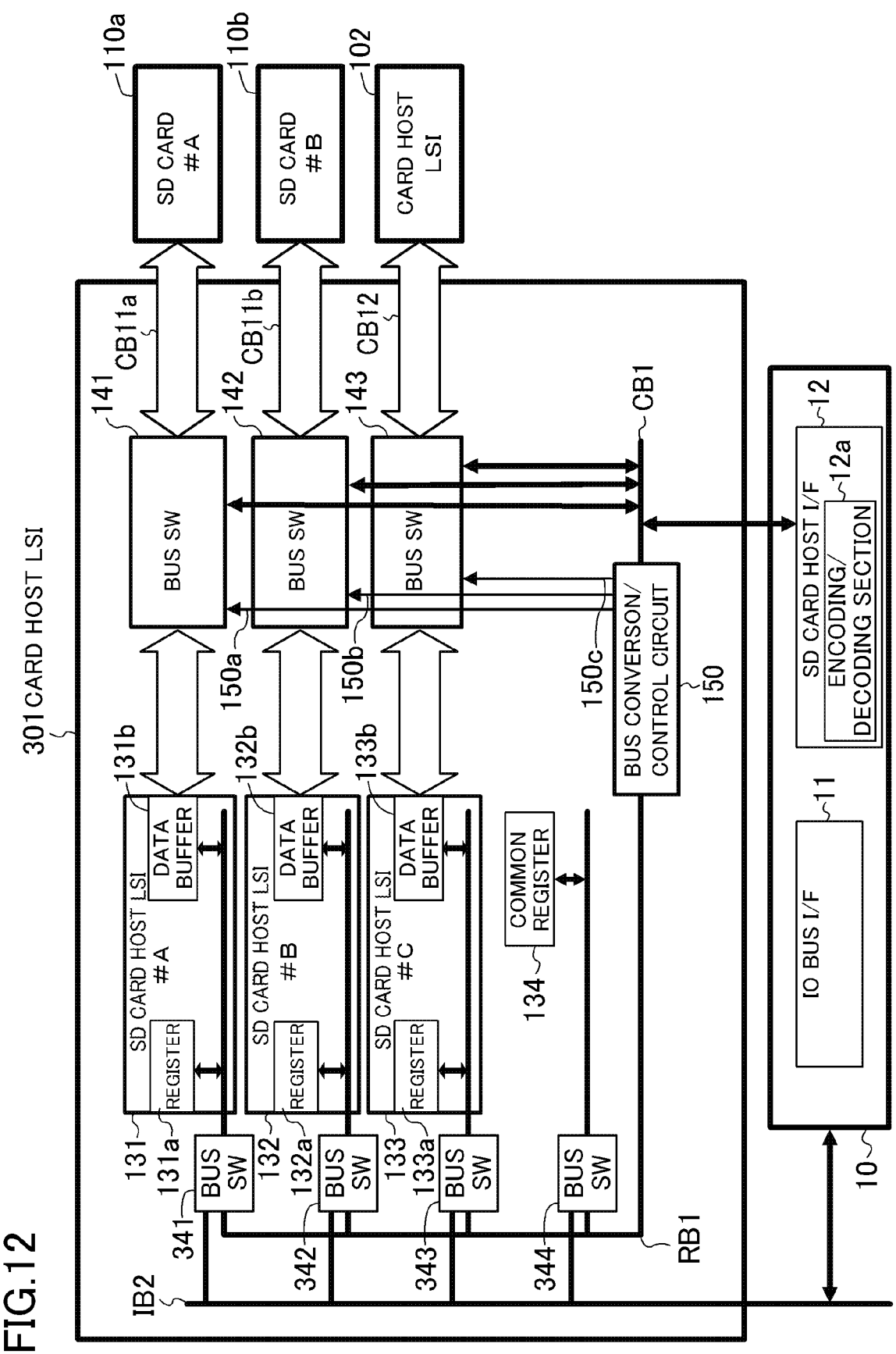
FIG. 12 is a detailed constitutional diagram of the card host LSI and its peripheral circuit in FIG. 11.

FIG. 11 is a constitutional diagram illustrating a set device 300 according to a third embodiment. Further, FIG. 12 is a detailed constitutional diagram illustrating a card host LSI 301 as the first card host LSI in FIG. 11 and its peripheral circuit. Also the set device according to the third embodiment has the function for controlling SD cards as a removable card and the embedded module complying with the card bus specifications for the SD cards similarly to the first and second embodiments.

The card host LSI 101 according to the first embodiment is controlled from the main microcomputer LSI 10 only via the card bus CB1, but differently from the first embodiment, the card host LSI 301 according to the third embodiment can be controlled also via the IO bus IB2 as a third card bus. FIGS. 11 and 12 illustrate the constitution in which FIGS. 1 and 3 according to the first embodiment are modified. However, since the same holds for FIGS. 9 and 10 according to the second embodiment, a diagram showing a modified version of the second embodiment is omitted. Further, the components common with those in FIGS. 1 and 3 are denoted by the same symbols, and detailed description thereof is omitted.

As shown in FIG. 11, the set device 300 contains the main microcomputer LSI 10 as the microcomputer module, the peripheral IO-LSIs 27a and 27b and card host LSIs 301 and 102. The main microcomputer LSI 10 contains the IO bus I/F 11 and the SD card host I/F 12 having the encoding/decoding section 12a. The IO bus I/F 11 is connected to the peripheral IO-LSIs 27a and 27b and further connected to the card host LSI 301 via the IO bus IB2. The SD card host I/F 12 is connected to the card host LSI 301 that functions as a slave via the card bus CB1 similarly to FIG. 1.

FIG. 12 is a detailed constitutional diagram illustrating the card host LSI 301 and its peripheral circuit in FIG. 11. Differently from FIG. 3, the card host LSI 301 contains the bus switches 341, 342, 343 and 344 for switching between the IO bus IB2 and the register bus RB1. The provision of the bus switches 341, 342 and 343 enables the SD card host I/Fs 131, 132 and 133 to be controlled also via the IO bus IB2. Also the common register 134 can be controlled via the IO bus IB2 due to the provision of the bus switch 344. The switching of the bus switches 341, 342, 343 and 344 may be controlled from an external terminal of the card host LSI 301 or via the card bus CB1 or IO bus IB2 (not shown).

Figure 13:
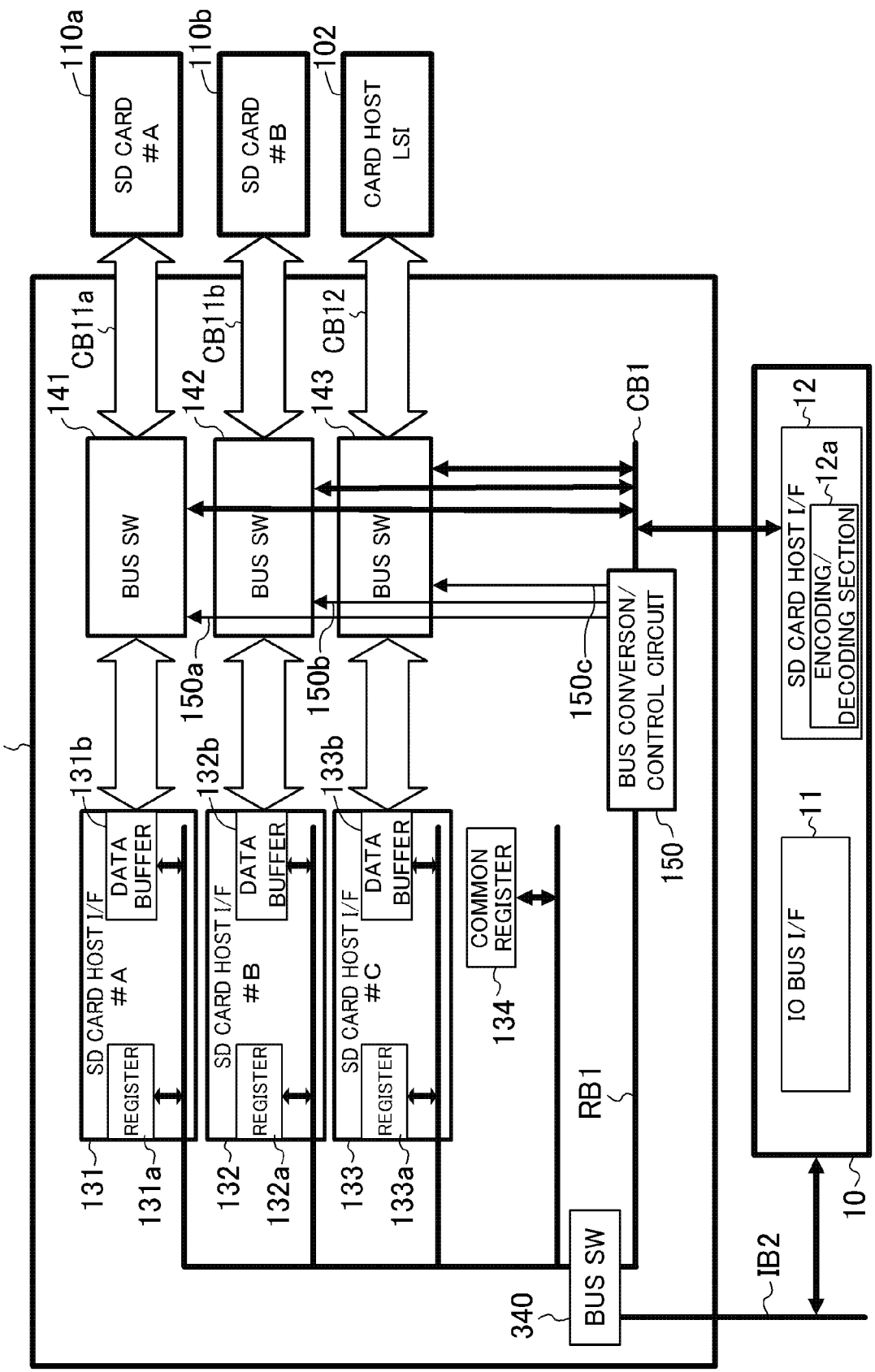
FIG. 13 illustrates a modified example of a constitution in FIG. 12.
Figure 14:
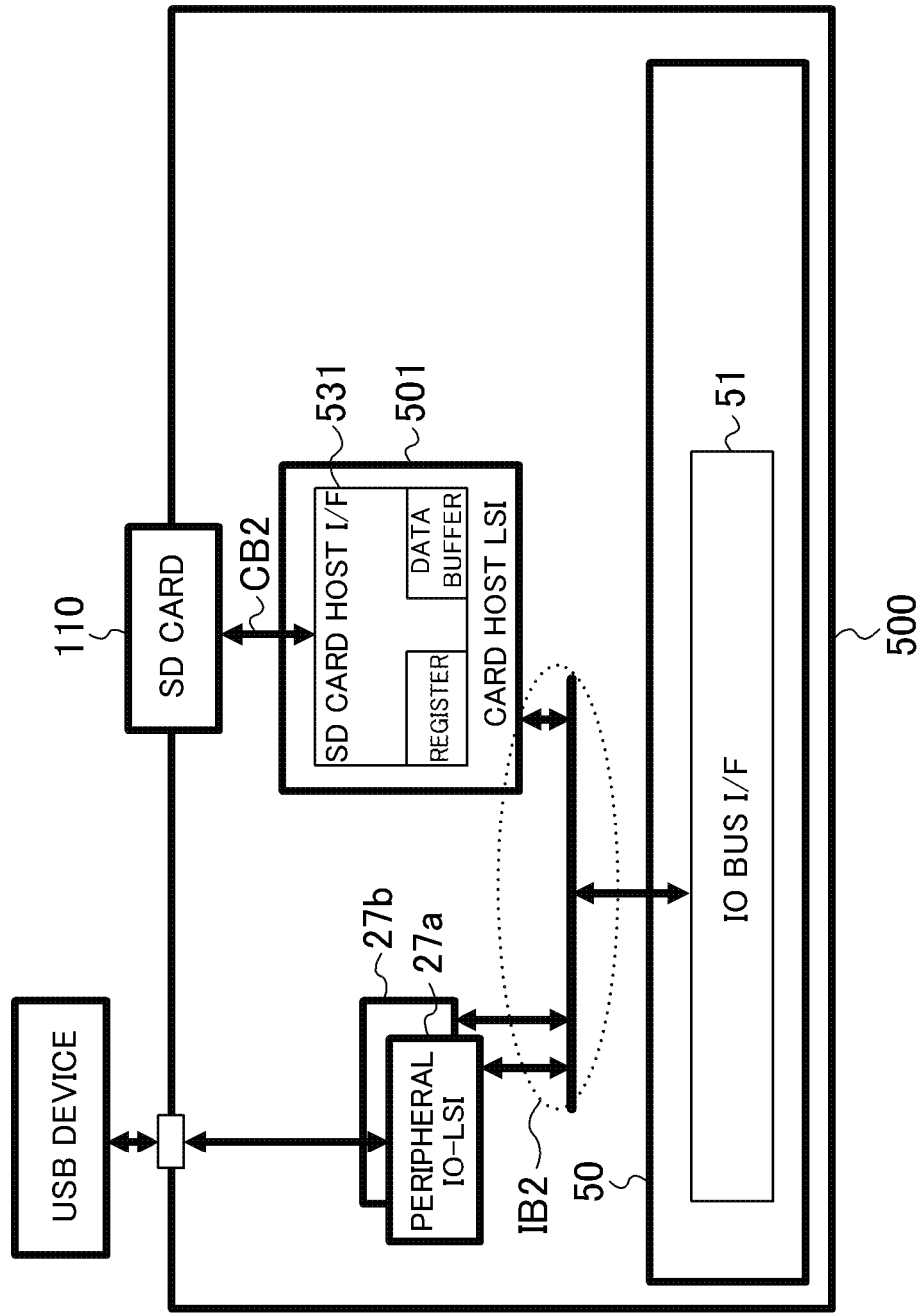
FIG. 14 is a constitutional diagram illustrating a conventional set device having a card host LSI.
Figure 15:
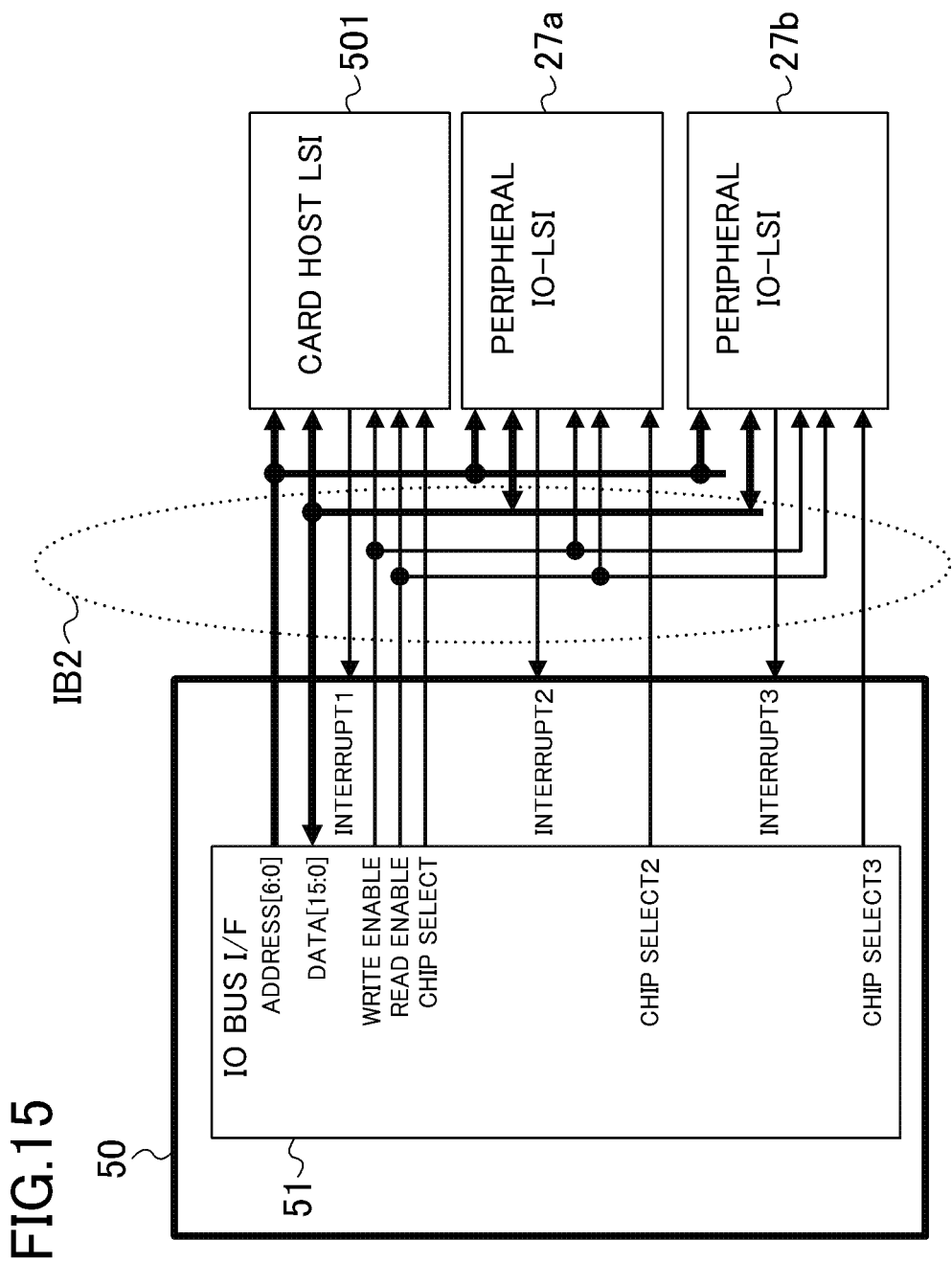
FIG. 15 is a diagram illustrating a detailed constitution of an IO bus.
Figure 16:
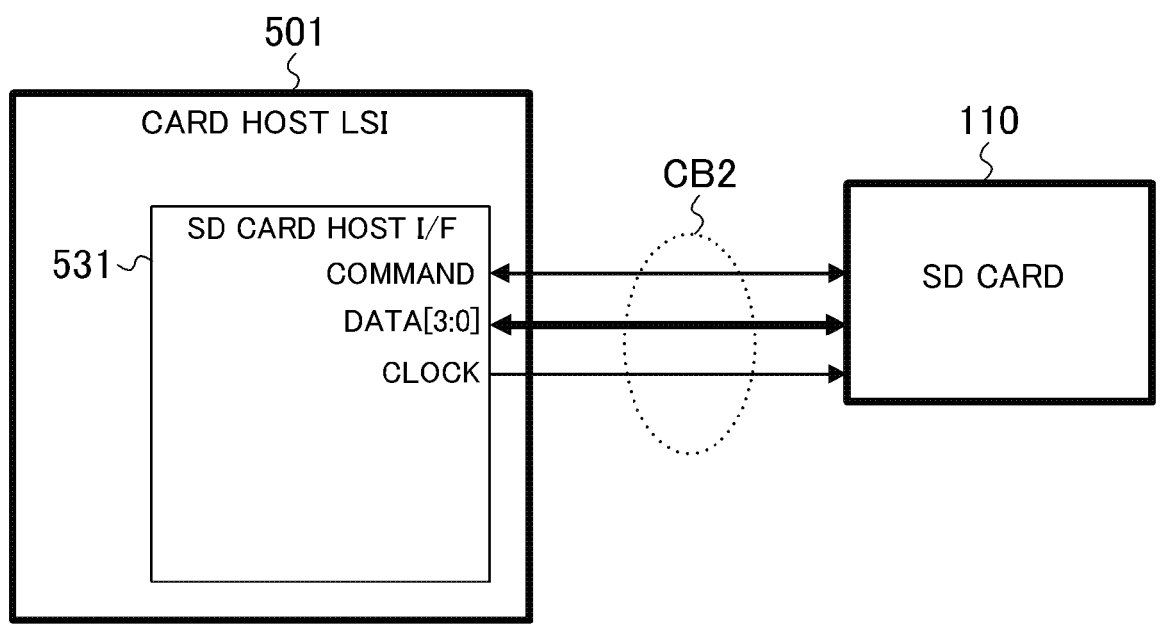
FIG. 16 is a diagram illustrating a detailed constitution of the card bus.

With this constitution, when the SD card host I/F 12 is slow, the card host LSI 301 can be controlled by using the IO bus IB2. In this case, the bus switches 341, 342, 343 and 344 may be unified, so as to switch between control via the card bus CB1 and control via the IO bus IB2 for the card host LSI 301 in whole. FIG. 13 is a diagram illustrating the constitution in this case, and a bus switch 340 obtained by unifying the bus switches 341, 342, 343 and 344 is provided. However, like the constitution in FIG. 12, the provision of the bus switches 341, 342 and 343 to the SD card host I/Fs 131, 132 and 133, respectively, realizes a function for switching between control via the card bus CB1 and control via the IO bus IB2 for each of the card buses CB11a, CB11b and CB12 as a plurality of second card buses.

The use of both the card bus CB1 and the IO bus IB2 can produce an effect such that the SD card host I/Fs 131, 132 and 133 or the common register 134 can be controlled even when the card bus CB1 is occupied. For example, when SD card 110a is controlled in the direct through mode or the register through mode from the card bus CB1, simultaneously the SD card 110b can be controlled from the IO bus IB2 via the SD card host I/F 132.

The third embodiment describes the example that the conventional IO bus IB2 is additionally connected to the card host LSI 301 with the card bus CB1. However, in another example, the other buses such as the card bus CB2 shown in FIG. 1 and a general-purpose port generally provided to a microcomputer may be additionally connected to the card host LSI 301.

The above embodiments describe the SD card as an example, but the present invention is not limited to this. That is to say, when the set device has the function for controlling at least any one of a removable card complying with the predetermined card bus specifications and an embedded module complying with the predetermined card bus specifications, and the card bus complying with the predetermined card bus specifications is used similarly to the above embodiments, the constitution and the operation similar to the above embodiments can be realized.

As described above, in the set device having the card host LSI, since high-speed data transmission to a removable card or the like is enabled without hindering a reduction in size and weight, the set device is useful for both the reduction in size and weight and an improvement in the performance of a cellular phone terminal, for example.

What is claimed is:

1. A set device having a function for controlling at least one of a removable card complying with card bus specifications for SD cards and an embedded module complying with the card bus specifications for SD cards, the set device comprising:
   a microcomputer module having a master function of the card bus specifications for SD cards;
   a card host LSI having a master function and a slave function of the card bus specifications for SD cards;
   a first card bus, complying with the card bus specifications for SD cards, for connecting the microcomputer module to the card host LSI; and
   a second card bus, complying with the card bus specifications for SD cards, for connecting the card host LSI to the removable card or the embedded module.

2. The set device of claim 1, wherein:
   the card host LSI has a bus switch, and
   the bus switch is configured to switch between a first mode using the master function of the card host LSI as a master function of the second card bus and a second mode using the master function of the microcomputer module as the master function of the second card bus according to a card bus command from the microcomputer module.

3. The set device of claim 2, wherein
   when the card host LSI is in the first mode, data transmitted from the card host LSI is converted according to a card bus command from the microcomputer module.

4. The set device of claim 1, further comprising:
   a second card host LSI having a master function and a slave function of the card bus specifications for SD cards; and
   a third card bus, complying with the card bus specifications for SD cards, for connecting the card host LSI to the second card host LSI.

5. The set device of claim 1, wherein
   the first card bus has a command line and a data line, and
   when the microcomputer module controls a register in the card host LSI via the first card bus, the microcomputer changes a control flag, a register address and writing or reading data into frames of predetermined number of bits, and continuously transmits the frames to the data line of the first card bus.

6. The set device of claim 5, wherein
   a stuff bit is provided between the control flag and the register address in at least one of data formats of the frames.

7. The set device of claim 5, wherein
   at least one of data formats of the frames is provided with an end flag that shows whether the frame is a last frame in a current command.

8. The set device of claim 5, wherein
   at least one of data formats of the frames is provided with a debug flag that shows whether a data log of the frame is stored.

9. The set device of claim 5, wherein
   at least one of data formats of the frames includes a source address, bit width information and a destination address, and "0" as the bit width information shows a function for copying data about the source address to the destination address.

10. The set device of claim 5, wherein:
    the card host LSI has a master function for a plurality of card buses and has a plurality of registers corresponding to the card buses, and
    at least one of data formats of the frames is provided with a selection flag for selecting all or some of the plurality of registers as a register in which writing is performed.

11. The set device of claim 5, wherein
    the frame is composed of $2^N$ (N: natural number) bits.

12. The set device of claim 1, wherein
the card host LSI has an inverting unit for inverting a clock on a signal path through which the clock input via the first card bus is output via the second card bus.

13. The set device of claim 1, further comprising:
a third card bus for connecting the microcomputer module and the card host LSI together separately from the first card bus, wherein
the card host LSI has a function for changing over between control via the first card bus and control via the third card bus.

14. The set device of claim 13, wherein
the card host LSI is configured to handle a plurality of the second card buses and has a function for changing over between control via the first card bus and control via the third card bus for each of the second card buses.

15. The set device of claim 1, wherein
the card host LSI converts data transmitted from the card host LSI according to a card bus command from the microcomputer module.

16. A card host LSI to be used in a set device having a function for controlling at least one of a removable card complying with card bus specifications for SD cards and an embedded module complying with the card bus specifications for SD cards, the card host LSI comprising:
a master function and a slave function of the card bus specifications for SD cards, wherein:
the card host LSI is configured to be connected to a first card bus, complying with the card bus specifications for SD cards, for connecting the card host LSI to a microcomputer module; and
the card host LSI is configured to be connected to a second card bus, complying with the card bus specifications for SD cards, for connecting the card host LSI to the removable card or the embedded module.

17. The card host LSI of claim 16, further comprising:
a bus switch, wherein
the bus switch is configured to switch between a first mode using the master function of the card host LSI as a master function of the second card bus and a second mode using a master function of the microcomputer module connected via the first card bus as a master function of the second card bus according to a card bus command input via the first card bus.

18. The card host LSI of claim 17, wherein
in the first mode, data transmitted from the card host LSI is converted according to the card bus command input via the first card bus.

19. The card host LSI of claim 16, further comprising:
an inverting unit for inverting a clock on a signal path through which the clock input via the first card bus is output via the second card bus.

20. The card host LSI of claim 16, wherein:
separately from the first card bus, the card host LSI is configured to be connected to a third card bus for connecting the card host LSI to the microcomputer module, and
the card host LSI has a function for changing over between control via the first card bus and control via the third card bus.

21. The set device of claim 1, further comprising:
a peripheral device, having a slave function of the card bus specifications for SD cards, which is any one of a communication device, a storage device, a GPS (Global Positioning System) device and an imaging device; and
a third card bus, complying with the card bus specifications for SD cards, for connecting the microcomputer module to the peripheral device.

22. The set device of claim 1, wherein
the card bus specifications for SD cards define protocols of a physical layer.

23. The card host LSI of claim 16, wherein
the card bus specifications for SD cards define protocols of a physical layer.

24. A set device having a function for controlling at least one of a removable card complying with predetermined card bus specifications and an embedded module complying with the predetermined card bus specifications, the set device comprising:
a microcomputer module having a master function of the predetermined card bus specifications;
a card host LSI having a master function and a slave function of the predetermined card bus specifications;
a first card bus, complying with the predetermined card bus specifications, for connecting the microcomputer module to the card host LSI; and
a second card bus, complying with the predetermined card bus specifications, for connecting the card host LSI to the removable card or the embedded module,
wherein the predetermined card bus specifications define protocols of a physical layer.

25. A card host LSI to be used in a set device having a function for controlling at least one of a removable card complying with predetermined card bus specifications and an embedded module complying with the predetermined card bus specifications, the card host LSI comprising:
a master function and a slave function of the predetermined card bus specifications, wherein:
the card host LSI is configured to be connected to a first card bus, complying with the predetermined card bus specifications, for connecting the card host LSI to a microcomputer module,
the card host LSI is configured to be connected to a second card bus, complying with the predetermined card bus specifications, for connecting the card host LSI to the removable card or the embedded module, and
the predetermined card bus specifications define protocols of a physical layer.

26. The card host LSI of claim 25, further comprising:
a bus switch, wherein
the bus switch is configured to switch between a first mode using the master function of the card host LSI as a master function of the second card bus and a second mode using a master function of the microcomputer module connected via the first card bus as a master function of the second card bus according to a card bus command input via the first card bus.

27. The card host LSI of claim 26, wherein
in the first mode, data transmitted from the card host LSI is converted according to the card bus command input via the first card bus.

28. The card host LSI of claim 25, further comprising:
an inverting unit for inverting a clock on a signal path through which the clock input via the first card bus is output via the second card bus.

29. The card host LSI of claim 25, wherein
separately from the first card bus, the card host LSI is configured to be connected to a third card bus for connecting the card host LSI to the microcomputer module, and the card host LSI has a function for changing over between control via the first card bus and control via the third card bus.

* * * * *